(12) United States Patent
Walkin

(10) Patent No.: US 10,168,796 B2
(45) Date of Patent: *Jan. 1, 2019

(54) METHODS AND SYSTEMS FOR DEFINING GESTURES FOR A USER INTERFACE

(71) Applicant: Facebook, Inc., Menlo Park, CA (US)

(72) Inventor: Brandon Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,624

(22) Filed: Jan. 10, 2018

(65) Prior Publication Data

US 2018/0136736 A1    May 17, 2018

Related U.S. Application Data

(63) Continuation of application No. 14/938,757, filed on Nov. 11, 2015, now Pat. No. 9,870,062.

(51) Int. Cl.
| | |
|---|---|
| *G06F 3/01* | (2006.01) |
| *G06F 3/0484* | (2013.01) |
| *G06F 8/34* | (2018.01) |
| *G06F 8/38* | (2018.01) |
| *G06F 3/0488* | (2013.01) |

(52) U.S. Cl.
CPC ............ *G06F 3/017* (2013.01); *G06F 3/0484* (2013.01); *G06F 3/04883* (2013.01); *G06F 8/34* (2013.01); *G06F 8/38* (2013.01)

(58) Field of Classification Search
None
See application file for complete search history.

(56) References Cited

U.S. PATENT DOCUMENTS

| | | |
|---|---|---|
| 8,352,903 B1 | 1/2013 | Friedman |
| 9,329,828 B2 * | 5/2016 | Yamane ................. G06F 3/1446 |
| 9,348,563 B1 | 5/2016 | Xue et al. |

(Continued)

OTHER PUBLICATIONS

Walkin, Office Action, U.S. Appl. No. 14/938,757, dated Mar. 7, 2017, 12 pgs.

(Continued)

*Primary Examiner* — Duane N Taylor, Jr.
(74) *Attorney, Agent, or Firm* — Morgan, Lewis & Bockius LLP

(57) ABSTRACT

To develop a user-interface prototype, a gesture patch is selected, a gesture is specified for the gesture patch, a first layer patch corresponding to a first layer of the user-interface prototype is selected, and an output of the gesture patch is coupled to an input of the first layer patch. The patches are graphical elements. The gesture patch is associated with an underlying gesture recognition engine, physics engine, and state machine. The input of the first layer patch corresponds to a display parameter of the first layer, which corresponds to a first image in the user-interface prototype. The method also includes generating the user-interface prototype for display, receiving user-interaction data corresponding to the gesture for manipulating the user-interface prototype, and updating display of the user-interface prototype in accordance with the user-interaction data and the coupling of the gesture patch to the input of the first layer patch.

20 Claims, 29 Drawing Sheets

(56) References Cited

U.S. PATENT DOCUMENTS

| | | | |
|---|---|---|---|
| 9,756,096 | B1 | 9/2017 | Lilienthal et al. |
| 2006/0150148 | A1 | 7/2006 | Beckett et al. |
| 2007/0198922 | A1 | 8/2007 | Ludmann |
| 2013/0076797 | A1 | 3/2013 | Hou |
| 2013/0132875 | A1 | 5/2013 | Allen et al. |
| 2014/0297516 | A1 | 10/2014 | Brown et al. |
| 2015/0149966 | A1 | 5/2015 | Abraham et al. |
| 2015/0160808 | A1* | 6/2015 | Walkin .............. G06F 3/0481 715/800 |
| 2015/0222730 | A1* | 8/2015 | Gower ............... H04L 67/42 709/203 |
| 2016/0098250 | A1 | 4/2016 | Gross et al. |
| 2016/0110377 | A1 | 4/2016 | Yun et al. |
| 2017/0132019 | A1* | 5/2017 | Karashchuk ........ G06F 3/0482 |

OTHER PUBLICATIONS

Walkin, Notice of Allowance, U.S. Appl. No. 14/938,757, dated Jul. 18, 2017, 6 pgs.

Origami-Design Prototyping, Oct. 12, 2015, https://facebook.github.io/origami/, 5 pgs.

Design Prototyping with Origami, Jay Thrash, Jan. 2014, http://vimeo.com/85578380, 1 pg.

Origami with Facebook, Feb. 24, 2015, https://www.facebook.com/origami.qc, 4 pgs.

Facebook paper has forever changed the way we build mobile apps, Mar. 6, 2014, http://www.wired.com/2014/03/facebook-paper/, 19 pgs.

Introducing Origami for Quartz Composer, Aug. 17, 2015, https://medium.com/the-year-of-the-looking-glass/introducing-origami-for-quartz-composer-f1173d0bd181, 5 pgs.

Prototyping with Facebook's Origami, Dan Counsell, May 13, 2014, http://dancounsell.com/articles/prototyping-with-facebooks-origami, 10 pgs.

Facebook Develops a Photoshop for Interaction Design, and It's Free for Anyone to Use, Feb. 3, 2014, http://www.fastcodesign.com/3025932/facebook-develops-a-photoshop-for-interaction-design-and-its-free-for-anyone-to-use, 11 pgs.

What are the best rapid prototyping tools for iOS apps?, Apr. 25, 2013, http://www.quora.com/What-are-the-best-rapid-prototyping-tools-for-iOS-apps, 11 pgs.

Rapid Prototyping for iPhone and iPad, Oct. 15, 2015, http://www.invisionapp.com/tour/iphone-ipad-prototyping, 5 pgs.

UI prototyping for the space age, Sep. 10, 2015, http://proto.io/en/tour/, 8 pgs.

Premaratne, Pasan. "UI Prototyping with Quartz Composer and Origami". Retrieved from the Internet (URL: https://web.archive.org/web/20140324122041/http://www.pasanpremaratne.com/2014/03/15/U1-Prototyping-with-Quartz-Composer-and-Origami/), Mar. 15, 2014 (Year: 2014).

Learning to Build Abstractions in Quartz Composer. Retrieved from the Internet (URL: https://web.archive.org/web/20140503163943/http://sartak.org/2014/03/learning-to-build-abstractions-in-quartz-composer.html), May 3, 2014 (Year: 2014)14).

Quartz Composer and Origami tutorial—create a simple button animation. Punchkick Interactive. Retrieved from the Internet (URL: https://www.punchkick.com/blog/2014/04/01/quartz-composer-and-origami-tutorial-button-animation), Apr. 1, 2014 (Year: 2014).

Walkin, Office Action, U.S. Appl. No. 14/887,037, dated Nov. 2, 2017, 22 pgs.

Walkin, Notice of Allowance, U.S. Appl. No. 14/887,037, dated Jun. 6, 2018, 12 pgs.

* cited by examiner

```
2015-02-12 14:13:38.583 Quartz Composer[52287:939663] Connected to {
    isTablet = 0;
    localizedModel = iPhone;
    model = iPhone;
    name = "Brandon's 6";
    retina = 1;
    systemName = "iPhone OS";
    systemVersion = "8.1";
}
```

```
2015-02-12 14:23:30.745 Quartz Composer[52287:939663] Removal. Data: (
    634478000
)
```

713

704

2015-02-12 14:13:38.662 Quartz Composer[52287:939663] Layer Tree. Data: (
    {
        alpha = 1;
        attachedRII = 0;
        colorB = 1;
        colorG = 1;
        colorR = 1;      713        706-A
        height = 1334;
        id = 634478000;
        image = "";
        maskImage = "";
        parentRII = 266299504;
        scale = 1;
        width = 750;
        x = 0;
        xRotation = 0;
        y = 0;
        yRotation = 0;
        z = 0;
        zRotation = 0;
    },
    {
        alpha = 1;
        attachedRII = 0;
        colorB = 1;
        colorG = 1;
        colorR = 1;     705         706-B
        height = 2100;                      707
        id = 560442000;
        image = acd72eb4eba5b56de5209b5b8ba9959d;
        maskImage = "";
        parentRII = 266299504;
        scale = 1;
        width = 750;
        x = 0;
        xRotation = 0;
        y = "-382.9999999999999";
        yRotation = 0;
        z = 0;
        zRotation = 0;
    }
)                                                                           708
2015-02-12 14:13:38.925 Quartz Composer[52287:939784] Image. Hash:
acd72eb4eba5b56de5209b5b8ba9959d,560442000
            707              705

```
2015-02-12 14:21:11.763 Quartz Composer[52287:939663] changes: {
    560442000 =     {
        y = "-378.4834777898158";
    };
}                                           711
2015-02-12 14:21:11.778 Quartz Composer[52287:939663] changes: {
    560442000 =     {
        y = "-372.462389118364";
    };
}
2015-02-12 14:21:11.794 Quartz Composer[52287:939663] changes: {
    560442000 =     {
        y = "-366.4384776205309";
    };
}
2015-02-12 14:21:11.811 Quartz Composer[52287:939663] changes: {
    560442000 =     {
        y = "-360.4173889490789";
    };
}
2015-02-12 14:21:11.827 Quartz Composer[52287:939663] changes: {
    560442000 =     {
        y = "-354.3963002776271";
    };
}
2015-02-12 14:21:11.843 Quartz Composer[52287:939663] changes: {
    560442000 =     {
        y = "-347.6215169623511";
    };
}
2015-02-12 14:21:11.860 Quartz Composer[52287:939663] changes: {
    560442000 =     {
        y = "-339.3421671858072";
    };
}
2015-02-12 14:21:11.893 Quartz Composer[52287:939663] changes: {
    560442000 =     {
        y = "-330.3091227654386";
    };
}
2015-02-12 14:21:11.910 Quartz Composer[52287:939663] changes: {
    560442000 =     {
        y = "-317.5104279523293";
    };
}
2015-02-12 14:21:11.928 Quartz Composer[52287:939663] changes: {
    560442000 =     {
        y = "-304.7117331392198";
    };
}
```

METHODS AND SYSTEMS FOR DEFINING GESTURES FOR A USER INTERFACE

RELATED APPLICATION

This application is a continuation of U.S. Nonprovisional application Ser. No. 14/938,757, filed Nov. 11, 2015, entitled "Methods and Systems for Defining Gestures for a User Interface," which is incorporated by reference in its entirety.

TECHNICAL FIELD

This relates generally to mobile application development, including but not limited to defining gestures for a user interface.

BACKGROUND

As mobile devices such as smartphones and tablets have grown in popularity and use across the population, mobile applications have grown in popularity and use as well. For a mobile application developer, in order to meet the needs of current users and to gain new users, efficiency in mobile application development is more important than ever.

A key aspect of mobile application development is the development of the user interface of the application, including defining the various elements of the user interface, possible interactions within the user interface, and how the interactions affect the elements. A user interface may have many possible types of interactions, such as gesture, and each interaction type may have many parameters to configure or define. A more efficient way to define interactions in a user interface will speed up, and benefit, the application development process overall.

SUMMARY

Accordingly, there is a need for faster, more efficient methods and systems for defining gestures for a user interface of an application, e.g., for a prototype of an application in development. Such methods and interfaces optionally complement or replace conventional methods for defining gestures for a user interface.

In accordance with some embodiments, a method is performed at an electronic device having one or more processors and memory storing instructions for execution by the one or more processors, the instructions including a utility for prototyping a user interface having one or more layers. The method includes, in the utility: for each image of one or more images in the user interface, selecting an image patch, selecting a layer patch, and coupling an image output of the image patch to an image input of the layer patch, where respective images of the one or more images correspond to respective layers of the one or more layers; selecting a gesture patch and specifying a gesture for the gesture patch, where the gesture patch is associated with an underlying gesture recognition engine, physics engine, and state machine; coupling an output of the gesture patch to an input of a first layer patch, where the input of the first layer patch corresponds to a display parameter of a first layer of the one or more layers; generating the user interface for display in accordance with the coupling of each image patch, each layer patch, and the gesture patch; receiving user-interaction data for manipulating the user interface, the user-interaction data corresponding to the gesture; and in response to the user-interaction data, updating display of the user interface in accordance with the user-interaction data and the gesture patch as coupled to the first layer patch.

In accordance with some embodiments, an electronic device includes one or more processors, memory, and one or more programs; the one or more programs are stored in the memory and configured to be executed by the one or more processors. The one or more programs include a utility for prototyping a user interface having one or more layers and instructions for performing the operations of the method described above. In accordance with some embodiments, a non-transitory computer-readable storage medium has stored therein one or more programs for execution by one or more processors of an electronic device. The one or more programs include a utility for prototyping a user interface having one or more layers and instructions that, when executed by the electronic device, cause the electronic device to perform the operations of the method described above. In accordance with some embodiments, an electronic device includes means for performing the operations of the method described above.

Thus, electronic devices are provided with faster, more efficient methods for defining gestures for a user interface, thereby increasing the effectiveness, efficiency, and user satisfaction with the application development process. Such methods may complement or replace conventional methods for defining gestures for a user interface.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 7A-7D are exemplary application prototype information sent from an electronic device in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first image could be termed a second image, and, similarly, a second image could be termed a first image, without departing from the scope of the various described embodiments. The first image and the second image are both images, but they are not the same image.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
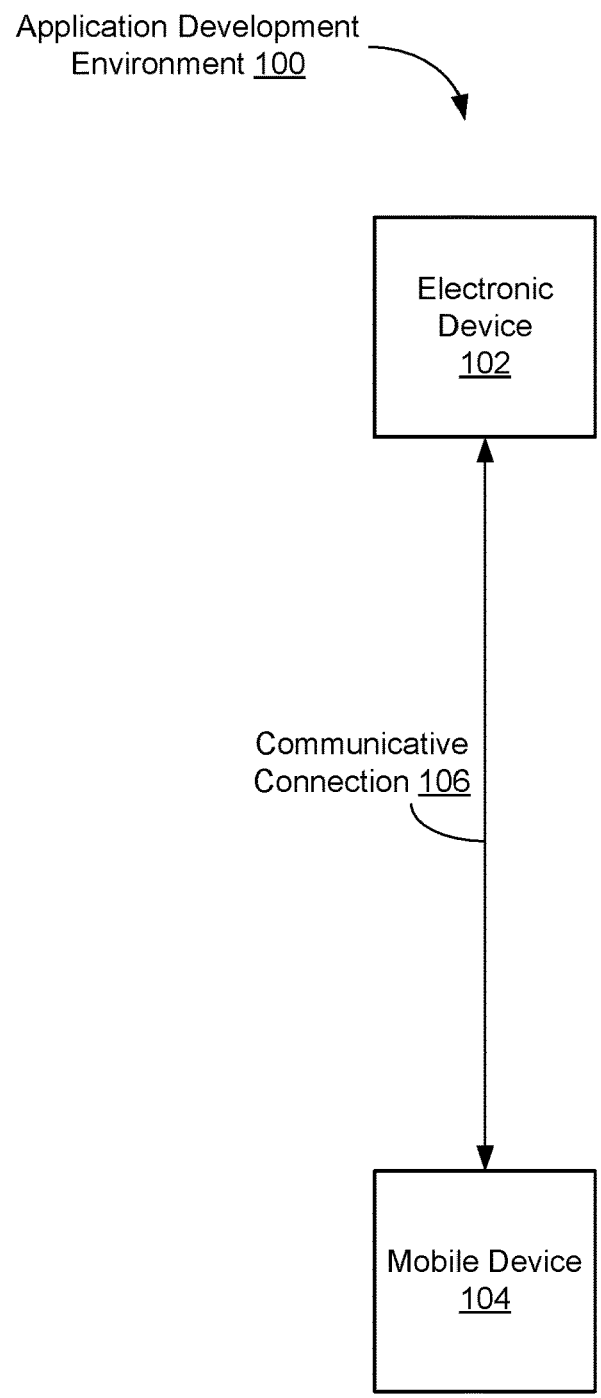
FIG. 1 is a block diagram illustrating an exemplary application development environment in accordance with some embodiments.

FIG. 1 is a block diagram illustrating an exemplary application development environment 100 in accordance with some embodiments. The application development environment 100 includes an electronic device 102 communicably connected to a mobile device 104 by a communicative connection 106. In some embodiments, the electronic device 102 and/or the mobile device 104 are connected to one or more networks (e.g., a local area network, a wide area network, the Internet).

In some embodiments, the electronic device 102 is a computing device such as a desktop computer, laptop computer, workstation, and/or other appropriate computing device that can be used by a user to develop (e.g., create) an application (e.g., an application for mobile devices, also referred to as a "mobile app"). In some embodiments, a user creates an instance or version (e.g., a prototype) of an application by writing and compiling/interpreting source code and/or using an application development tool (e.g., QUARTZ COMPOSER by APPLE, INC.) at the electronic device 102. For testing purposes, the application prototype is executed, or the execution is simulated, at the electronic device 102. Data corresponding to graphical output resulting from the execution or simulated execution (e.g., the graphical user interface of the application prototype) is transmitted from the electronic device 102 to the mobile device 104 over the communicative connection 106. The mobile device 104 displays the graphical output in accordance with the data transmitted from the electronic device 102. In some embodiments, the graphical output is also displayed at the electronic device 102 (e.g., within the application development tool).

Below, for sake of convenience, execution of (or executing) the application prototype and simulation of (or simulating) the execution of the application prototype are both referred to as "execution of" (or "executing") the application prototype.

In some embodiments, the mobile device 104 is a computing device such as a smart phone, mobile phone, tablet computer, and/or other computing device for which a user wishes to develop an application. The mobile device 104 displays graphical output from the execution of the application prototype at the electronic device 102. The user may interact with the graphical output at the mobile device 104 as if the application prototype is running or executed at the mobile device 104. The mobile device 104 transmits data corresponding to the user interaction to the electronic device 102. The electronic device 102 updates the graphical output and corresponding data in accordance with the user interaction data. The electronic device 102 transmits data corresponding to the updated graphical output and/or data corresponding to the updates to the graphical output to the mobile device 104. The mobile device 104 displays updated graphical output in accordance with the data corresponding to the updated graphical output and/or data corresponding to the updates to the graphical output. In some embodiments, the updated graphical output is also displayed at the electronic device 102 (e.g., within the application development tool).

The electronic device 102 and mobile device 104 send data to and receive data from each other through the communicative connection 106. The communicative connection 106 is a wired (e.g., the devices 102 and 104 are connected to each other by a cable) or wireless connection. In some embodiments, the communicative connection 106 is a direct wired connection. For example, the electronic device 102 and the mobile device 104 may be connected to each other by a cable with a Universal Serial Bus (USB) connector plugged into the electronic device 102 and a connector appropriate for the particular mobile device 104 (e.g., Micro-USB, LIGHTNING by APPLE, INC.) plugged into the mobile device 104. In some other embodiments, the cable uses a different protocol; the connector at the cable end plugged into the electronic device 102 follows a protocol different from USB (e.g., Thunderbolt, Firewire, etc.). In some other embodiments, the communicative connection 106 is a direct wireless connection (e.g., an ad-hoc or peer-to-peer Wi-Fi connection, a Bluetooth connection).

An application may be defined as including multiple elements. In some embodiments, the elements in an application include one or more images and one or more layers with which the images are respectively associated. Optionally, the application includes other elements, such as one or more of: one or more animations, one or more transitions, and/or one or more interactions (e.g., gestures). Additional information regarding these elements is described below.

Data transmitted between the electronic device 102 and the mobile device 104 include data corresponding to graphical output resulting from executing the application prototype and data corresponding to user interaction with the graphical output at the mobile device 104. In some embodiments, when the application prototype is initially executed, the electronic device 102 transmits initial data to the mobile device. The initial data includes data corresponding to the images and layers in the application, and initial display parameters. The mobile device 104 receives the initial data, and displays graphical output according to the initial data; the mobile device 104 displays one or more of the images, arranged according to their layer associations, in accordance with the initial display parameters.

When the user interacts with the graphical output at the mobile device 104, the mobile device 104 detects the user interaction. The mobile device 104 transmits data corresponding to the user interaction to the electronic device 102. The electronic device 102 determines updates or changes to the graphical output in accordance with the user interaction data, and sends indications of the updates to the mobile device 104. The mobile device 104 displays graphical output in accordance with the indications of the updates; the electronic device 102 need not re-transmit the images and layers along with the indications of the updates.

Figure 2:
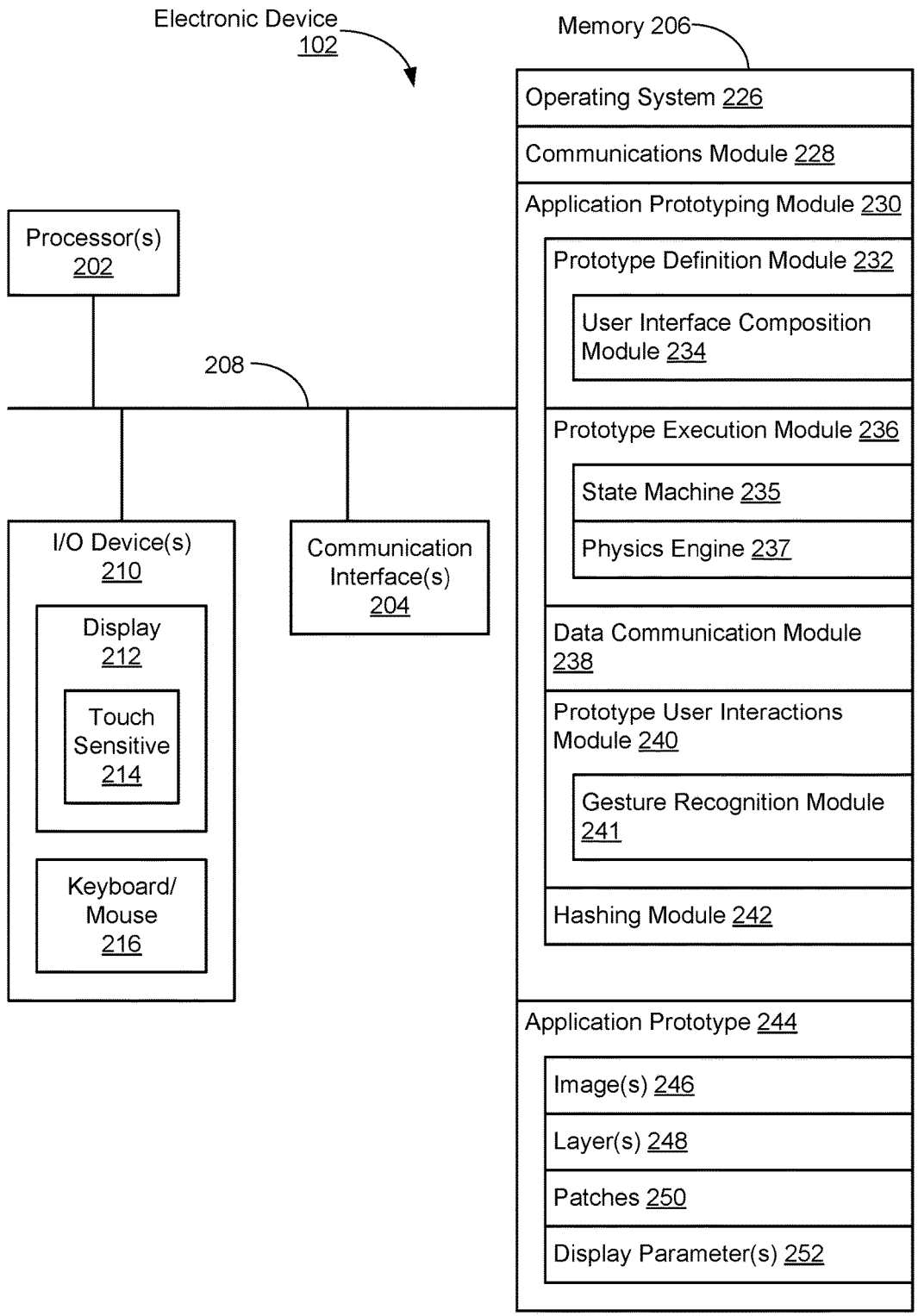
FIG. 2 is a block diagram illustrating an exemplary electronic device in accordance with some embodiments.

FIG. 2 is a block diagram illustrating an exemplary electronic device 102 in accordance with some embodiments. The electronic device 102 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. In some embodiments, the communication interfaces 204 include a USB interface and/or another interface for a wired communicative connection. The electronic device 102 includes one or more input/output (I/O) devices 210. The I/O device(s) 210 typically includes a display device 212. In some embodiments, the electronic device 102 includes inputs such as a keyboard, mouse, and/or other input buttons 216. Alternatively or in addition, in some embodiments, the display device 212 includes a touch-sensitive surface 214, in which case the display device 212 is a touch-sensitive display. In client devices that have a touch-sensitive display 212, a physical keyboard is optional (e.g., a soft keyboard may be displayed when keyboard entry is needed). In some embodiments, the I/O devices 210 also include an audio output device (not shown), such as speakers or an audio output connection connected to speakers, earphones, or headphones. Furthermore, in some embodiments the electronic device 102 uses a microphone and voice recognition to supplement or replace the keyboard. Optionally, the electronic device 102 includes an audio input device (not shown) (e.g., a microphone) to capture audio (e.g., speech from a user). Optionally, the electronic device 102 includes a location detection device (not shown), such as a GPS (global positioning satellite) or other geo-location receiver, for determining the location of the electronic device 102. The electronic device 102 also optionally includes an image/video capture device (not shown), such as a camera or webcam.

Memory 206 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 226 that includes procedures for handling various basic system services and for performing hardware dependent tasks;
- a communications module 228 that is used for connecting the electronic device 102 to other computers or devices via the one or more communication interfaces 204 (wired or wireless) and one or more communication networks or connections, such as the Internet, cellular telephone networks, mobile data networks, other wide area networks, local area networks, metropolitan area networks, direct (wired or wireless) communicative connections, and so on;
- an application prototyping module 230 for generating and executing application prototypes (e.g., application prototype 244) and communicating data related to execution of the application prototype 244; including the following modules (or sets of instructions), or a subset or superset thereof:
  - a prototype definition module 232 for providing tools and interfaces to the user for defining application prototypes and receiving user definitions of an application prototype, including a user interface composition module 234 for providing an interface to the user for defining the application prototype 244 by composition of a user interface of the application prototype;
  - a prototype execution module 236 for executing the application prototype 244 and generating corresponding display parameters 252 for displaying graphical output corresponding to the execution of the application prototype 244, including a state machine 235 for tracking the state of the executing application prototype 244 and a physics engine 237 for simulating physics effects in the graphical output of the executing application prototype 244 in response to user interaction at the mobile device 104;
  - a data communication module 238 for communicating data related to execution of the application prototype 244 (e.g., images 246, layers 248, indications of updates to display parameters 252) and handshaking with the mobile device 104;
  - a prototype user interactions module 240 for receiving data (e.g., user interaction data 346) corresponding to user interactions with graphical output of the executing application prototype 244 at the mobile device 104, including a gesture recognition engine 241 for recognizing and determining the gesture performed by the user interacting with the graphical output at the mobile device 104; and
  - a hashing module 242 for generating hashes of data associated with the application prototype 244, e.g., generating hashes of images 246; and
- an application prototype 244 generated by the application prototyping module 240 in accordance with user definition, including the following data or information, or a subset or superset thereof:

one or more image(s) 246, which are the graphical content to be displayed as graphical output when the application prototype 244 is executed;

one or more layer(s) 248, which define the virtual layers in which the images 246 are arranged and displayed;

patches 250; and display parameter(s) 252, which define various parameters for displaying the images 246 as graphical output of the executing application prototype 244.

In some embodiments, the application prototyping module 230 also includes a module (not shown) for displaying graphical output corresponding to the executing application prototype 244 at the electronic device 102 (e.g., simulating or mirroring the application prototype graphical output displayed at the mobile device 104).

Further details on patches 250 are described below, in relation to FIGS. 4A-4E. In some embodiments, images 246 and layers 248 have corresponding patches 250. In some embodiments, initial values for display parameters 252 are defined using the patches 250.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 stores a subset of the modules and data structures identified above. Furthermore, memory 206 optionally stores additional modules and data structures not described above.

Figure 3:
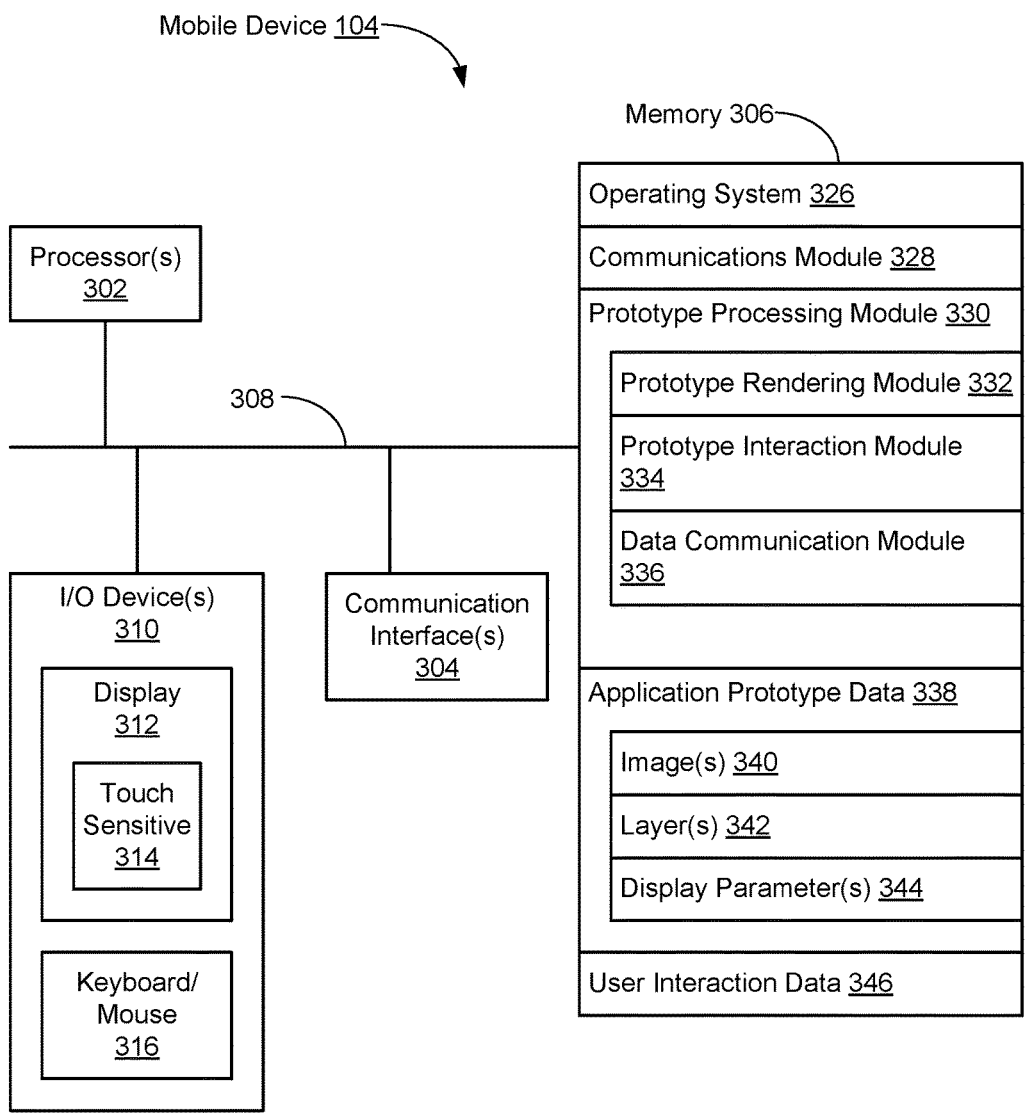
FIG. 3 is a block diagram illustrating an exemplary mobile device in accordance with some embodiments.

FIG. 3 is a block diagram illustrating an exemplary mobile device 104 in accordance with some embodiments. The mobile device 104 typically includes one or more processing units (processors or cores) 302, one or more network or other communication interfaces 304, memory 306, and one or more communication buses 308 for interconnecting these components. The communication buses 308 optionally include circuitry (sometimes called a chipset) that interconnects and controls communications between system components. In some embodiments, the communication interfaces 304 include a USB interface (e.g., a micro-USB interface), or an interface that uses another protocol. The mobile device 104 includes one or more I/O devices 310. The I/O device(s) 310 typically include a display device 312. In some embodiments, the I/O devices 310 include inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). In some embodiments, the I/O devices 310 also include an audio output device (not shown), such as speakers or an audio output connection connected to speakers, earphones, or headphones. Furthermore, in some embodiments the mobile device 104 uses a microphone and voice recognition to supplement or replace the keyboard. Optionally, the mobile device 104 includes an audio input device (not shown) (e.g., a microphone) to capture audio (e.g., speech from a user). Optionally, the mobile device 104 includes a location detection device (not shown), such as a GPS (global positioning satellite) or other geo-location receiver, for determining the location of the mobile device 104. The mobile device 104 also optionally includes an image/video capture device (not shown), such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

an operating system 326 that includes procedures for handling various basic system services and for performing hardware dependent tasks;

a communications module 328 that is used for connecting the mobile device 104 to other computers or devices via the one or more communication interfaces 304 (wired or wireless) and one or more communication networks or connections, such as the Internet, cellular telephone networks, mobile data networks, other wide area networks, local area networks, metropolitan area networks, direct (wired or wireless) communicative connections, and so on;

a prototype processing module 330 for processing received data corresponding to the executing application prototype 244 (FIG. 2), including the following modules (or sets of instructions), or a subset or superset thereof:

a prototype rendering module 332 for rendering and displaying graphical output corresponding to the executing application prototype 244 and updating display parameter(s) 344 in accordance with data received from the electronic device 102;

a prototype interaction module 334 for detecting user interactions (e.g., gestures on the touch-sensitive surface 314) with the displayed graphical output at the mobile device 104 and generating corresponding user interaction data 346 for transmission to the electronic device 102; and data communication module 336 for communicating (e.g., receiving and sending) data corresponding to the executing application prototype 244 with the electronic device 102 (e.g., sending user interaction data 346 to the electronic device 102; receiving images 246 data, layers 248 data, and display parameters 252 data (initial values and indications of updates to parameters)) and handshaking with the electronic device 102;

application prototype data 338, including the following data or information, or a subset or superset thereof:

image(s) 340, corresponding to images 246 received from the electronic device 102;

layer(s) 342, corresponding to layers 248 received from the electronic device 102; and display parameter(s) 344, whose initial values correspond to initial values of display parameter(s) 252 received from the electronic device 102; and user interaction data 346, generated by the prototype interaction module 334, corresponding to user interactions with the displayed graphical output at the mobile device 104.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 306 store a subset of the modules and data structures identified above. Furthermore, memory 306 optionally store additional modules and data structures not described above.

Figure 4A:
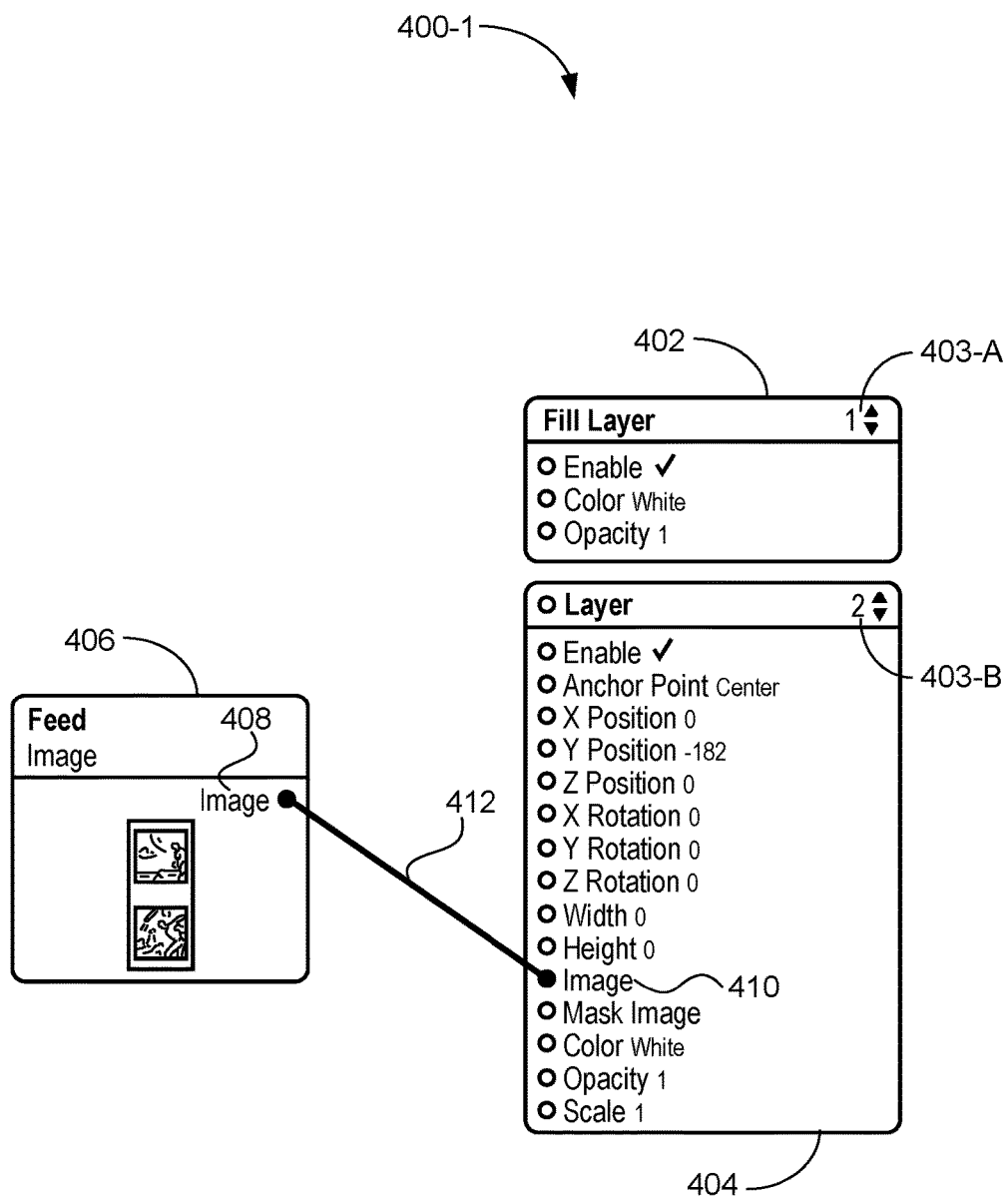
FIGS. 4A-4E illustrate exemplary application prototype definitions as displayed in an exemplary user interface composition utility and corresponding application prototype user interfaces in accordance with some embodiments.

Attention is now directed towards FIGS. 4A-4E, which illustrate exemplary definitions of application prototypes and corresponding graphical output in accordance with some embodiments. FIG. 4A illustrates an application prototype definition 400-1 of an example social networking application as displayed in a graphical user interface of a user interface composition module 234 (e.g., QUARTZ COMPOSER). Within the user interface composition module 234, a user can define a graphical user interface of an application prototype and corresponding possible interactions and transitions by creating a definition (e.g., definition 400-1) consisting of one or more elements referred to as "patches" (e.g., patches 250); a patch is an element (e.g., a box) in the graphical user interface of the user interface composition module 234. Each patch includes one or more outputs and optionally one or more inputs. A first patch may be associated with a second patch by coupling (e.g., linking) an output of the first patch with an input of the second patch. In some embodiments, available patches for defining a graphical user interface include layer patches, image patches, transition patches, animation patches, and interaction patches (e.g., a patch corresponding to a specific type of gesture).

As shown in FIG. 4A, definition 400-1 includes a layer patch 402, another layer patch 404, and an image patch 406. Layer patches 402 and 404 define the virtual layers on which images of the graphical user interface are displayed. Layer patch 402 is an example of a particular type of layer patch, a "fill layer" patch. In some embodiments, a fill layer is a layer that occupies the whole area of the graphical user interface and is simply filled with a specified color and having a specified opacity when displayed. In some embodiments, a fill layer is useful as a layer corresponding to a background in the graphical user interface. Layer patch 404 is an example of a general layer patch; the layer patch 404 includes various inputs for defining various corresponding display parameters (e.g., X Position, Y position, Z Position, etc.), including the image to be displayed on that layer. A fill layer is a special case of a layer more generally; a fill layer may be defined using a fill layer patch (e.g., layer patch 402) or a general layer patch (e.g., layer patch 404).

In some embodiments, each layer patch in the definition 400 is assigned a position 403 in a z-order; images associated with a layer higher in the z-order are displayed over or overlap images associated with a layer lower in the z-order (e.g., in response to user inputs selecting respective layers). For example, in definition 400-1, layers 402 and 404 are assigned respective positions 403-A and 403-B in a z-order. Based on the positions, the image associated with layer patch 404 is displayed above the fill layer 402.

The definition 400-1 also includes an image patch 406. The image patch 406 specifies an image that is to be displayed in a respective layer. For example, the image patch 406 is named "Feed" and corresponds to a content feed view of the social networking application. The image patch 406 is associated with the layer patch 404 by a line 412 coupling the "Image" output 408 of the image patch 406 with the "Image" input 410 of the layer patch 404; the layer patch 404 takes as its associated image the image of image patch 406.

Figure 4B:

FIG. 4B illustrates an example graphical output when the application prototype corresponding to definition 400-1 is executed. In some embodiments, the graphical output is displayed on the mobile device 104 by the prototype processing module 330 (e.g., the prototype rendering module 332). In some embodiments, displaying of the graphical output at the mobile device 104 is simulated or mirrored at the electronic device 102 by the application prototyping module 230. The application prototyping module 230 displays, at the electronic device 102, a mock mobile device that shows the graphical output displayed within; displaying the mock mobile device and displaying the graphical output in the mock mobile device simulates the mobile device 104 displaying the graphical output. Thus, the mobile device 414 in FIG. 4B may be the actual mobile device 104 or the mock mobile device displayed at the electronic device 102.

When the application prototype corresponding to definition 400-1 is executed, the image corresponding to image patch 406 is displayed above a color layer corresponding to the layer patch 402. Thus, in FIG. 4B, a content feed image 416-A corresponding to the image patch 406 is displayed in the mobile device 414 over a color fill layer corresponding to the layer patch 402; the color fill layer may be hidden by the content feed image 416-A.

Figure 4C:
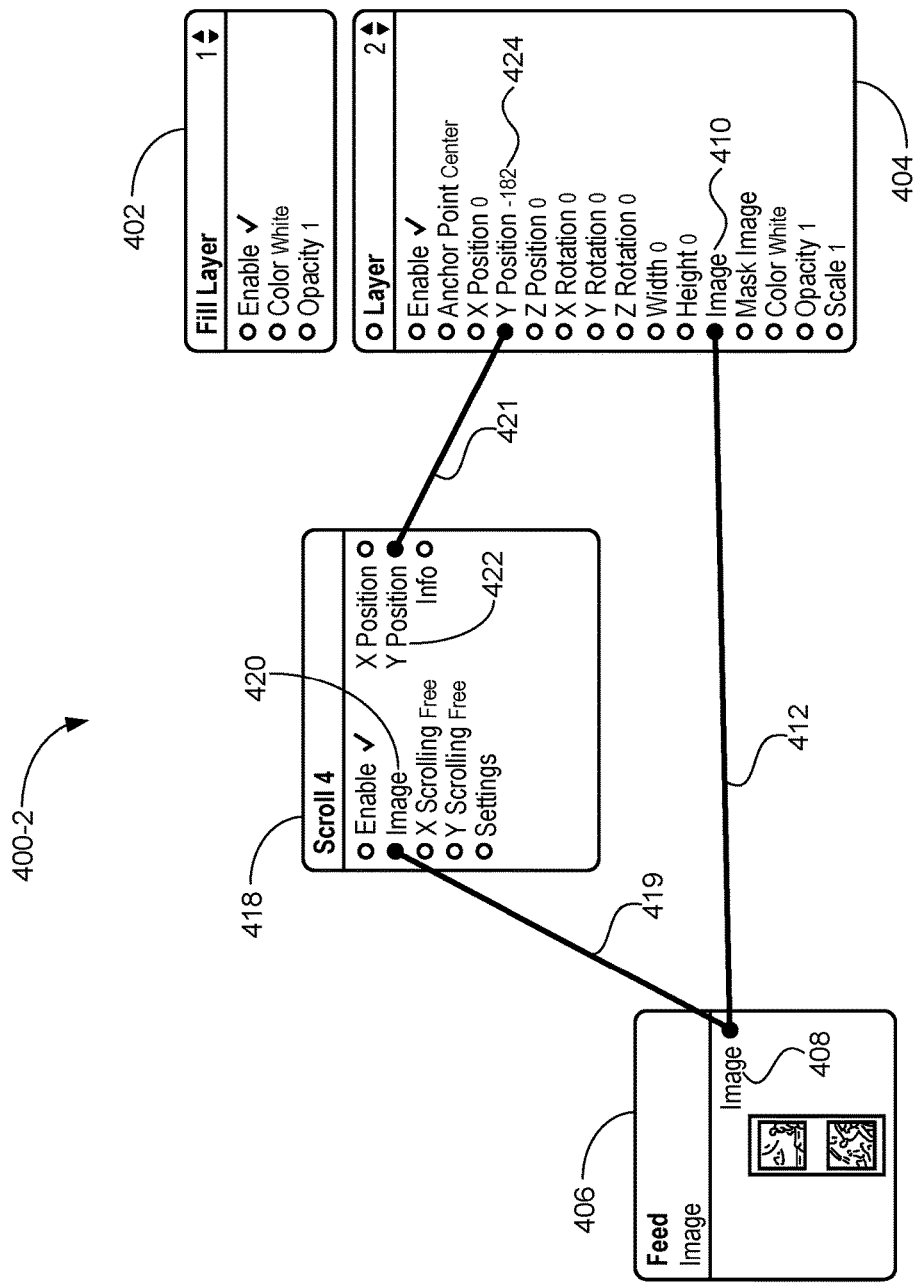

FIG. 4C illustrates a definition 400-2 with an additional patch 418 added, compared to definition 400-1. The definition 400-2 includes the patches 402, 404, and 406 as described above in relation to FIGS. 4A-4B. Image patch 406 is still coupled to layer 404 by line 412. However, in FIG. 4C, an animation patch 418 named "Scroll 4" has been introduced into the definition 400. The animation patch 418 defines an animation of an image, in this case a scrolling animation. The animation patch 418 takes as an input the image 420 affected by the animation. In definition 400-2, the image output 408 of the patch 406 is coupled to the image input 420 of the patch 418 by a line 419; the scrolling animation scrolls the image corresponding to the image patch 406. The animation patch 418 also includes one or more outputs, including a Y position output 422 that defines a Y position value resulting from the scrolling animation. The Y position output 422 is coupled to a Y position input 424 of the layer patch 404 by a line 421; the scrolling animation affects the Y position of the image displayed on the layer corresponding to the layer patch 404.

Figure 4D:
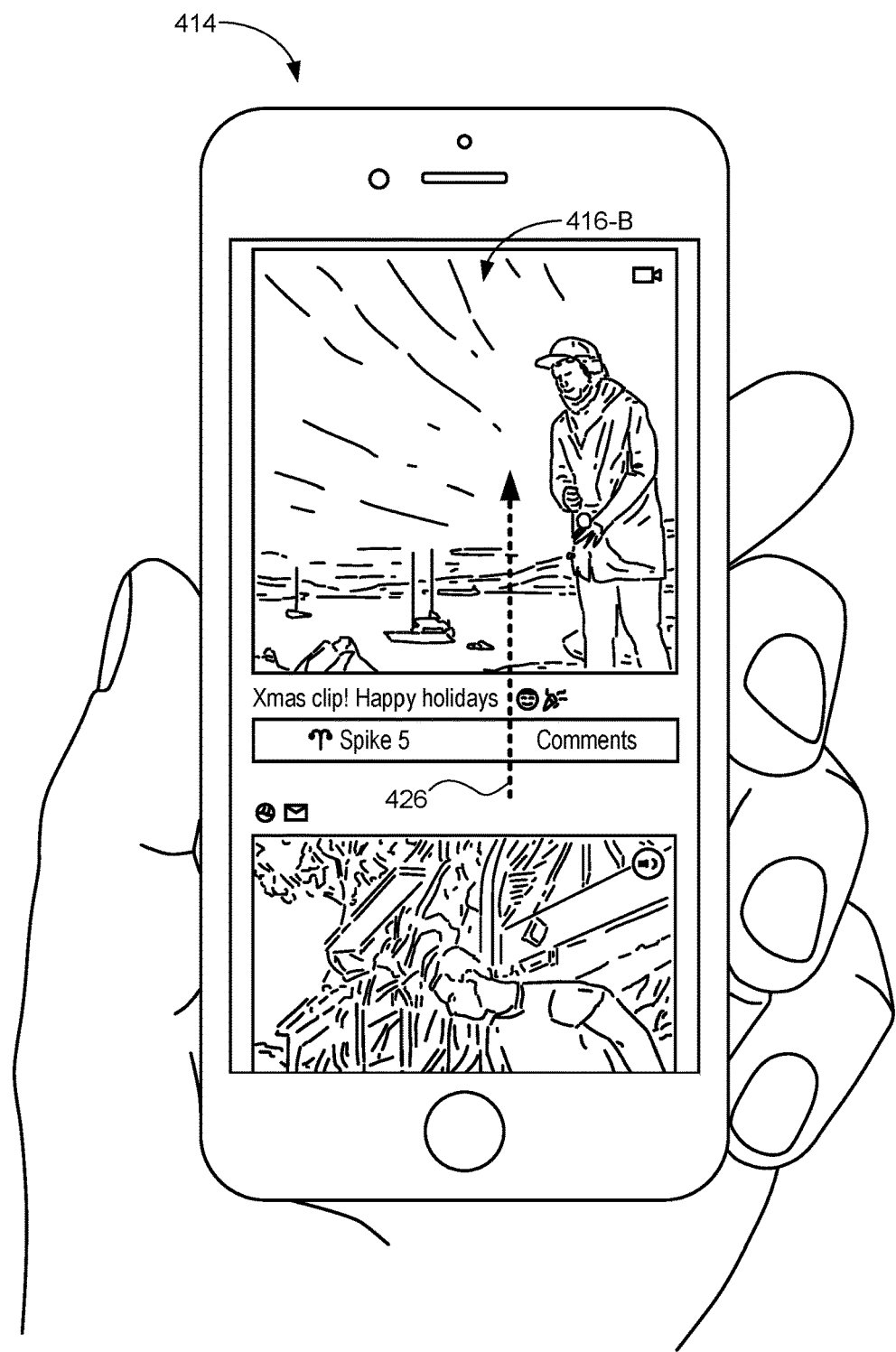

FIG. 4D illustrates an example graphical output when the application prototype corresponding to definition 400-2 is executed. The content feed image 416-B scrolls (e.g., in direction 426) over the color fill layer corresponding to the layer patch 402, in response to a user input (e.g., a gesture on the touch-sensitive surface 314).

Figure 4E:
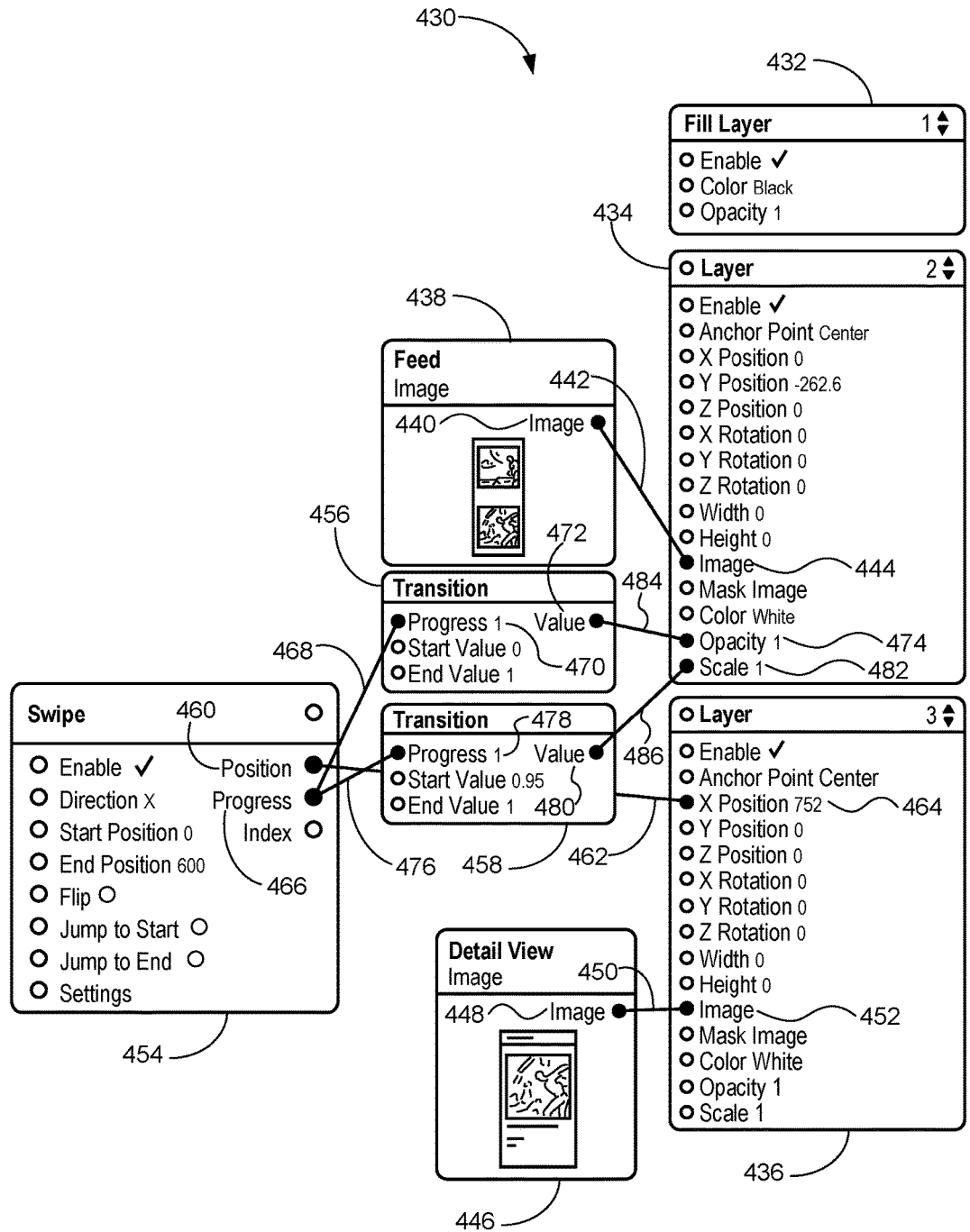

FIG. 4E illustrates another example application prototype definition 430. Definition 430 includes a fill layer patch 432 and layer patches 434 and 436. Image patch 438 is associated with layer patch 434 by coupling the image output 440 of image patch 438 to the image input 444 of layer patch 434 with line 442. Image patch 446 is associated with layer patch 436 by coupling the image output 448 of image patch 446 to the image input 452 of layer patch 436 with line 450.

Definition 430 also includes transition patches 456 and 458 and an interaction patch 454. The interaction patch 454 defines an interaction (e.g., a gesture) that may be performed by the user with respect to the graphical output of the application prototype. As shown in FIG. 4E, the interaction patch 454, named "Swipe," defines a swipe gesture interaction.

In some embodiments, an interaction patch outputs values that may be used as inputs for other patches. For example, the interaction patch 454 has, among a plurality of outputs, a "Position" output 460 and a "Progress" output 466. The position output 460 supplies a value corresponding to a position on the display area based on the swipe gesture interaction. The progress output 466 supplies a value for controlling progression of a transition based on the progression of the swipe gesture interaction. The position output 460 is coupled to the "X Position" input 464 of layer patch 436 by a line 462; the x-coordinate value for images associated with the layer patch 436 changes with a swipe gesture interaction in accordance with the swipe patch 454. Progress output 466 is coupled to "Progress" inputs 470 and 478 of transition patches 456 and 458, respectively, by lines 468 and 476, respectively.

In some embodiments, a transition patch (e.g., transition patches 456 and 458) defines a starting value and an end value for a transition effect, and receives as an input values from a progress output of an interaction patch. The progress output of an interaction patch supplies a progress value for controlling the progression of a transition based on the progression of an interaction (e.g., gesture). The transition patch outputs a value that may be used as the input for a display parameter of a layer patch 436 that varies on a value scale. For example, in FIG. 4E, value output 472 of transition patch 456 is coupled to opacity input 474 of layer patch 434 by line 484, and value output 480 of transition patch 458 is coupled to scale input 482 of layer patch 434 by line 486. With the coupling of the swipe patch 454 to opacity input 474 and scale input 482 of layer patch 434 via transition patches 456 and 458, respectively, the opacity and scale of images associated with the layer patch 434 transitions with a swipe gesture interaction in accordance with the swipe patch 454.

Figure 5A:
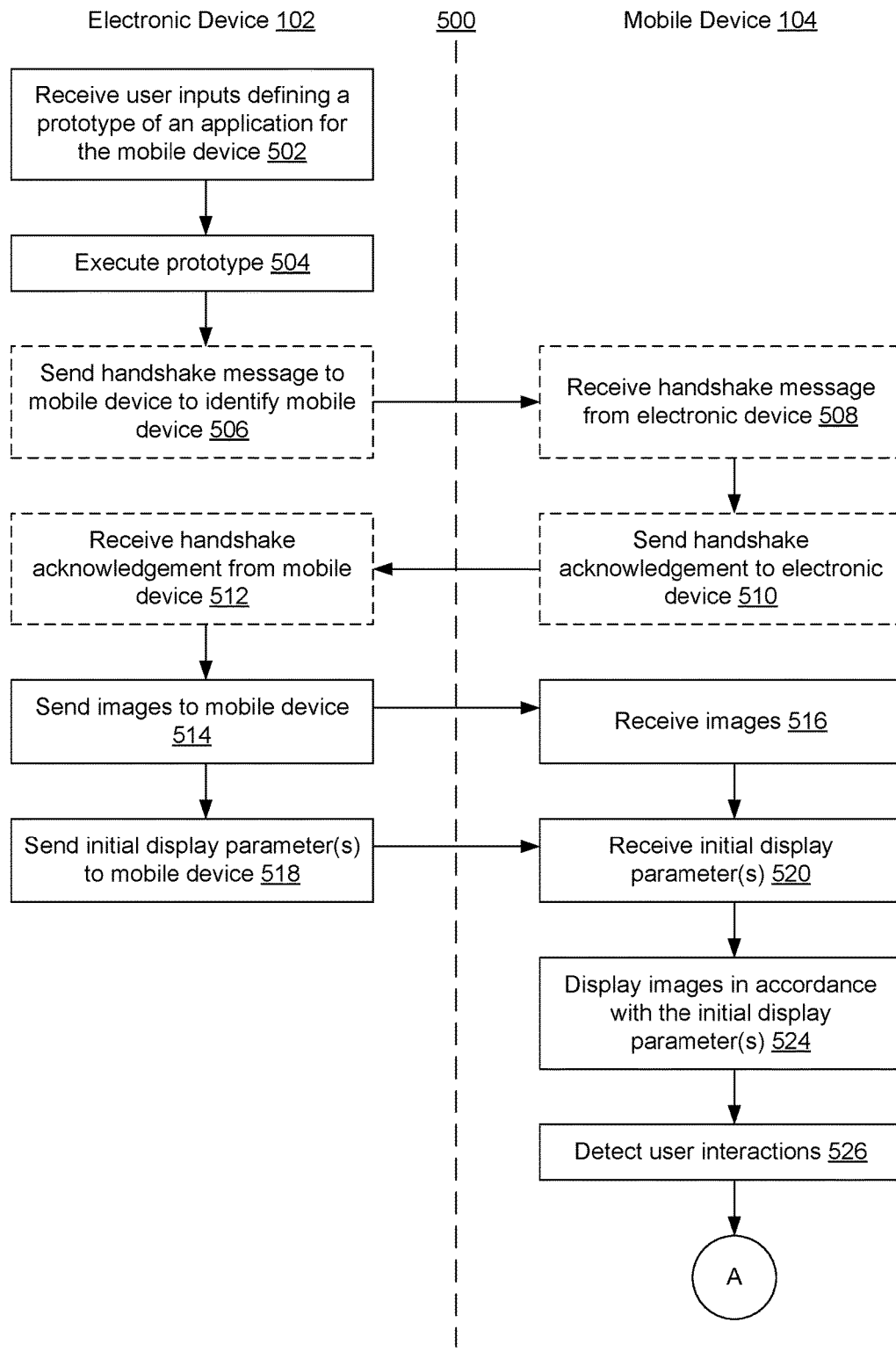
FIGS. 5A-5B are flow diagrams illustrating a method of communicating application prototype information in accordance with some embodiments.
Figure 5B:
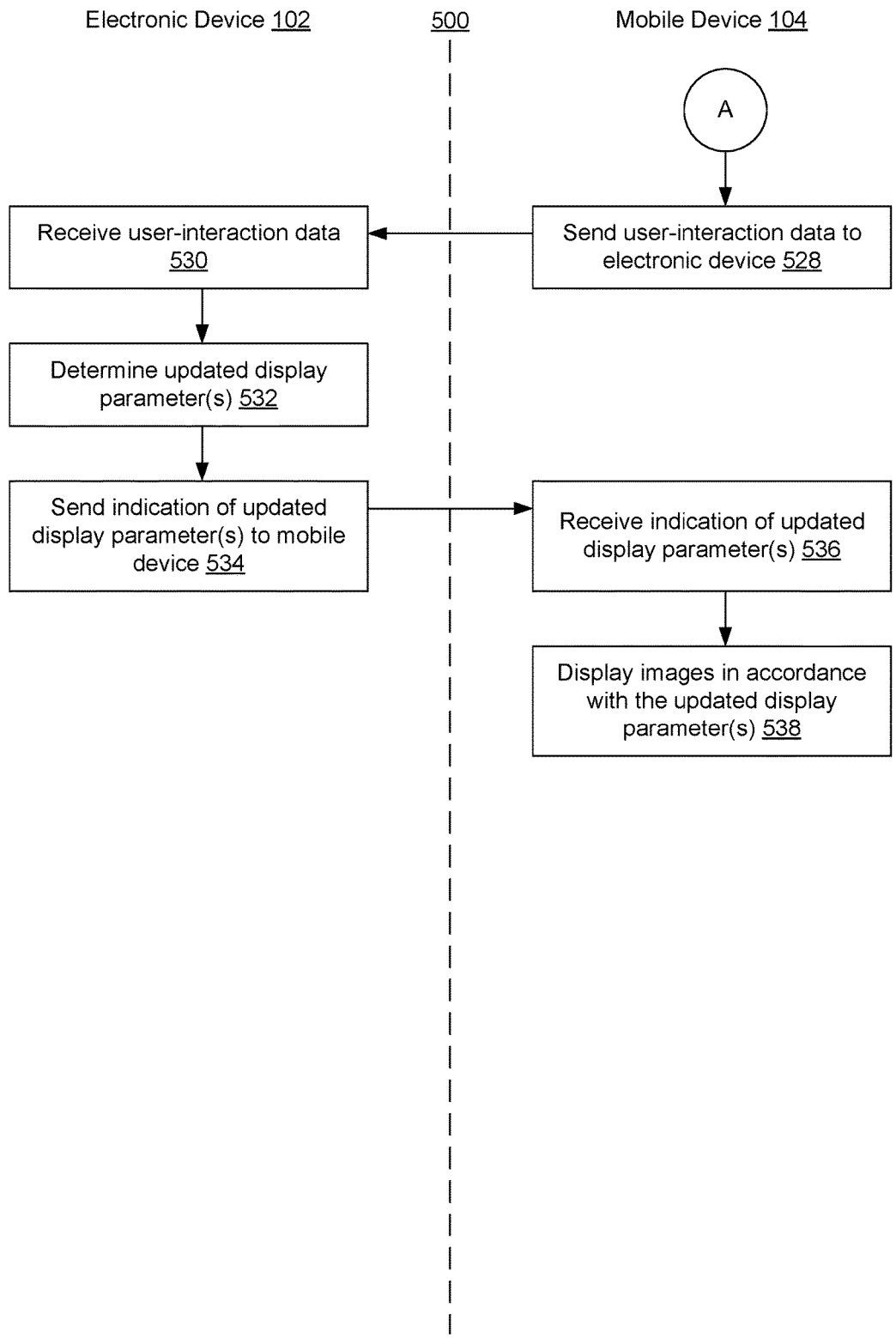
Figure 6A:
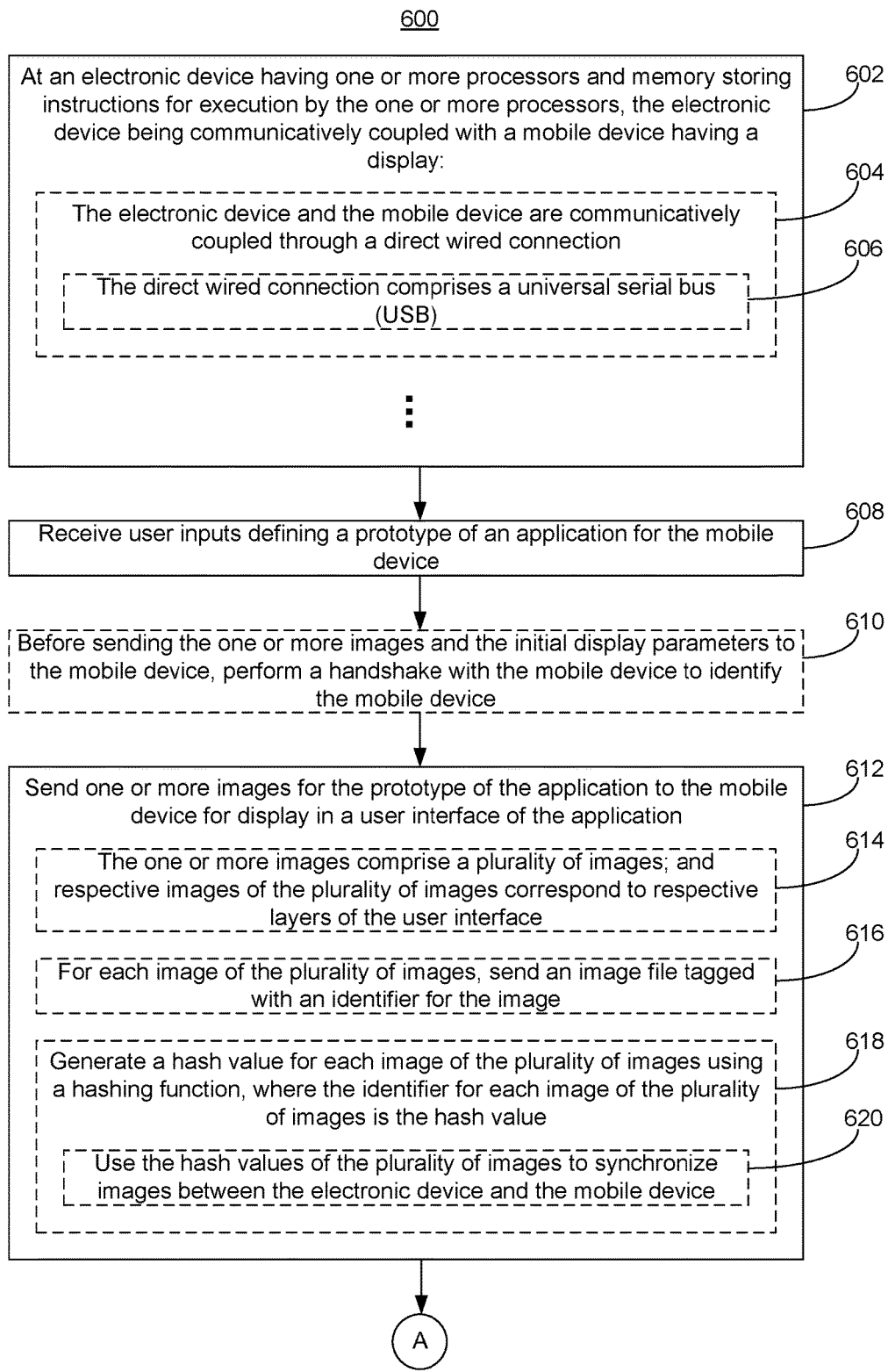
FIGS. 6A-6D are flow diagrams illustrating a method of communicating application prototype information in accordance with some embodiments.
Figure 6B:
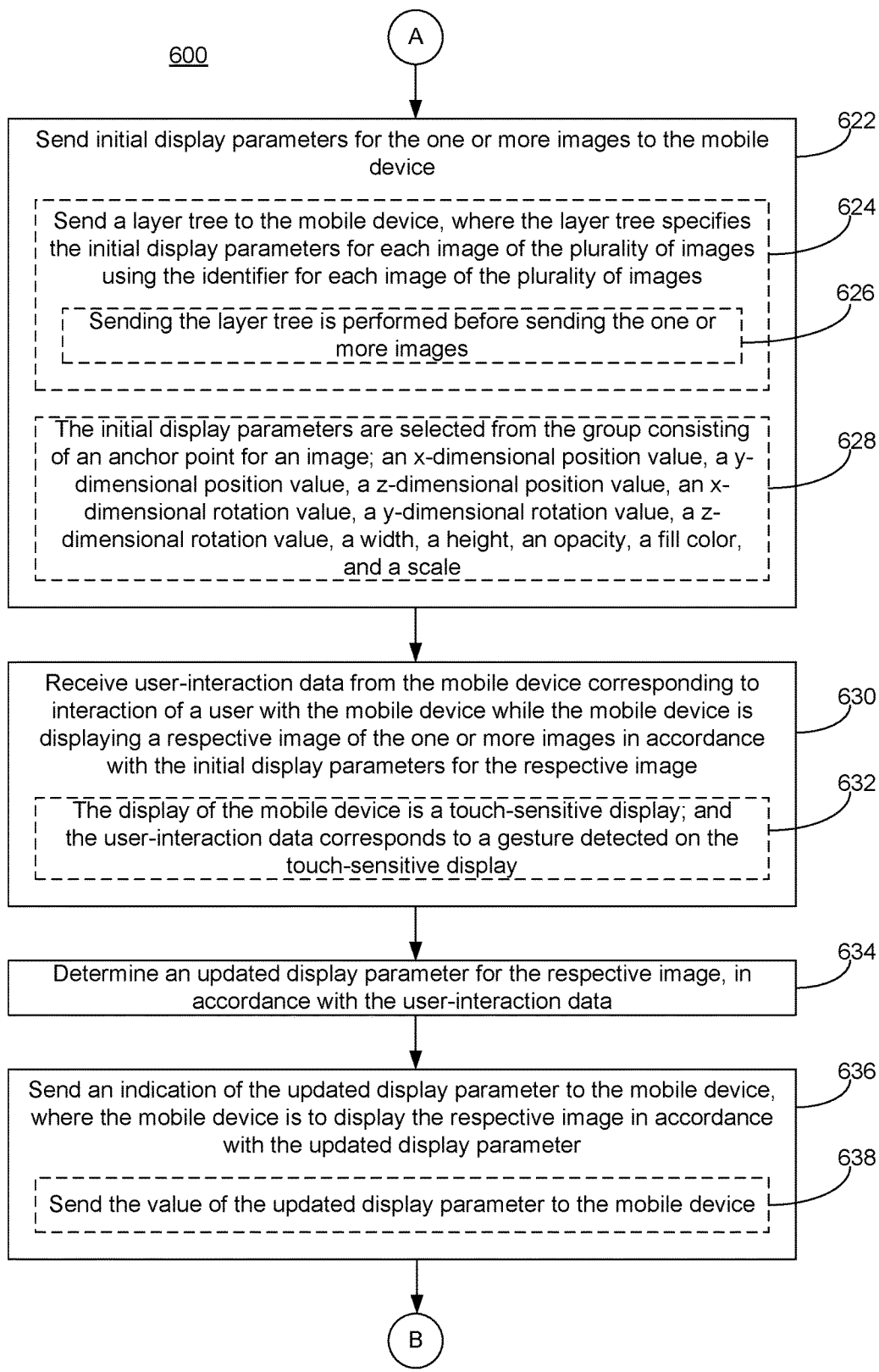
Figure 6C:
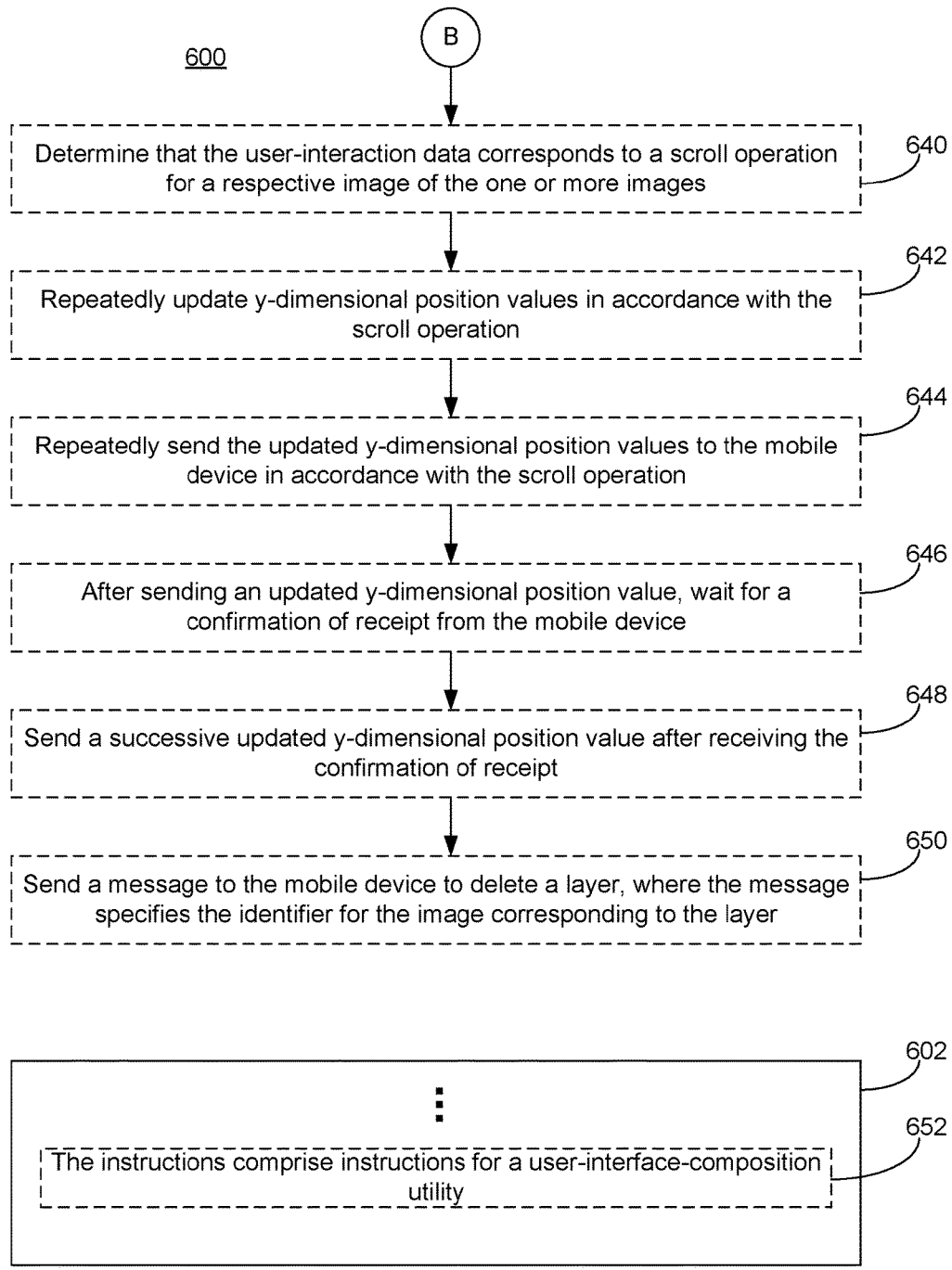
Figure 6D:
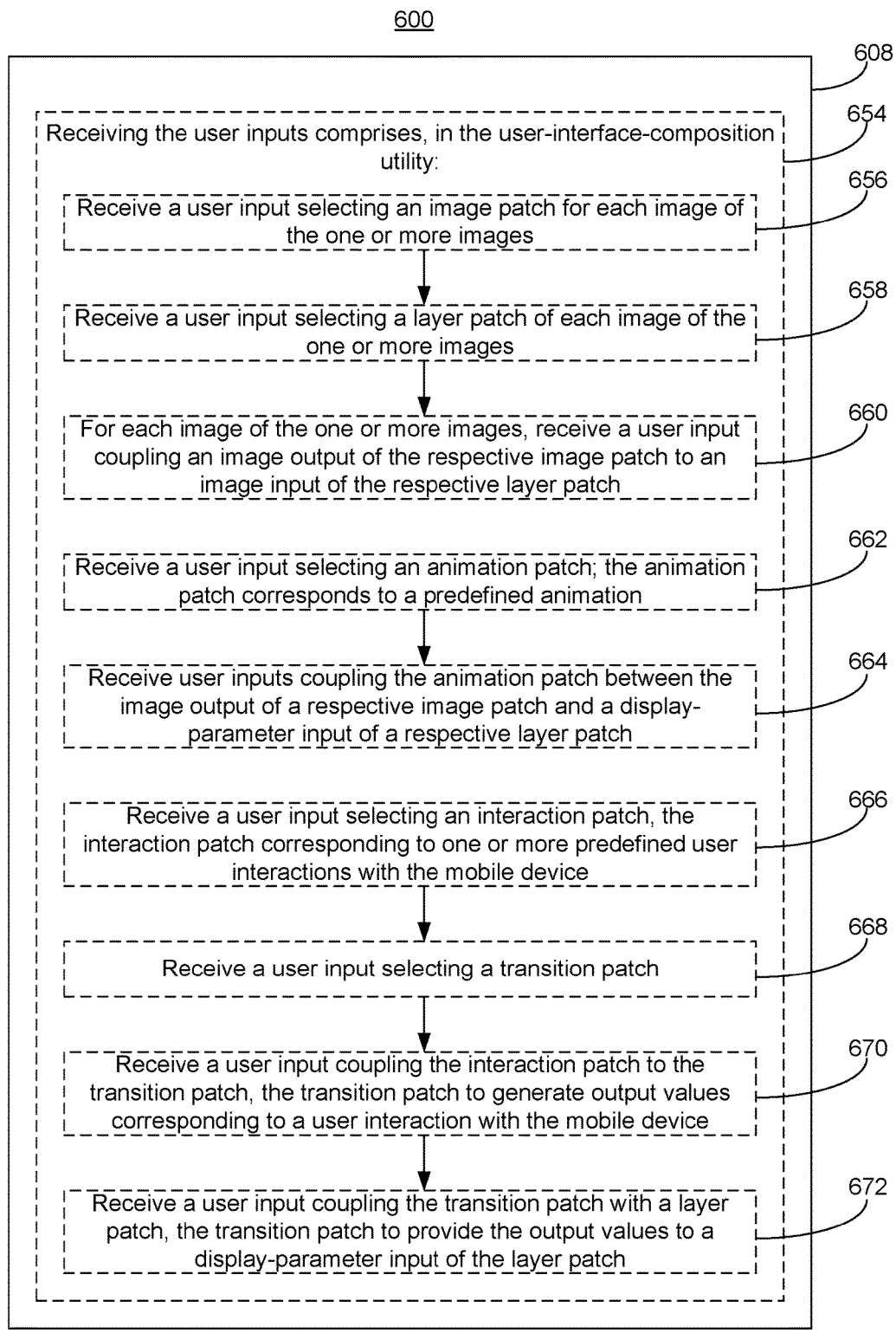

FIGS. 5A-5B are flow diagrams illustrating a method 500 of communicating application prototype information in accordance with some embodiments.

An electronic device (e.g., electronic device 102) receives (502) user inputs defining a prototype 244 of an application for the mobile device (e.g., mobile device 104). For example, the electronic device 102 includes tools, applications, etc. (e.g., prototype definition module 232, user interface composition module 234) in which a user can define a prototype of a mobile app by writing source code and/or defining a user interface of the prototype (e.g., creating a definition 400 or 430). The received user inputs may be, for example, textual input corresponding to the user writing source code and/or the user adding patches to a definition and coupling patches.

The electronic device 102 executes (504) the prototype 244. The prototype execution module 236 executes the prototype 244. In some embodiments, at the electronic device 104 a mock mobile device is displayed, with the graphical output from the execution of the prototype 244 displayed within the mock mobile device. In some embodiments, the state machine 235 tracks the state of the executing application prototype 244.

In some embodiments, the electronic device 102 sends (506) a handshake message to a communicatively connected mobile device 104 to identify the mobile device. For example, the data communication module 238 starts a handshake process with a communicatively connected (e.g., via a direct wired connection) mobile device to identify the mobile device, and thus ascertain the particular model and operating system, among other things, of the mobile device, as various mobile device features and specifications may vary by model and operating system.

The mobile device 104 receives (508) the handshake message from the electronic device. In response, the mobile device 104 sends (510) a handshake acknowledgement to the electronic device 102. In some embodiments, the handshake acknowledgement includes information that identifies the device, information such as device model, whether the device is a tablet computer or not, whether the device is a high-resolution display (e.g., retina display), and the operating system name and version. The electronic device 102 receives (512) the handshake acknowledgement from the mobile device 104. With the acknowledgement received, the prototype execution module 236 knows what the connected mobile device 102 is and can thus execute the prototype 244 based on what the mobile device 102 is.

Figure 7A:
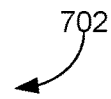

In some embodiments, the electronic device 102 sends a device identification confirmation to the mobile device 104 after receiving the handshake acknowledgement. The mobile device 103 receives the device identification confirmation and may use the confirmation to confirm that the electronic device 102 has received the handshake acknowledgement and correctly identified the mobile device 104. FIG. 7A illustrates an example device identification confirmation 702. The confirmation 702 includes information such as device model, whether the device is a tablet computer or not, whether the device is a high-resolution display (e.g., retina display), and the operating system name and version.

In some embodiments, the handshaking process (e.g., steps 506, 508, 510, 512) is performed prior to execution of the prototype (step 504).

The electronic device 102 sends (514) one or more images to the mobile device 104. When the prototype 244 is initially executed, image(s) 246 of the prototype 244 are sent (e.g., as image files) to the mobile device 104 for display. The mobile device 104 receives (516) the images 246 and stores the received images as images 340 of application prototype data 338.

The electronic device 102 sends (518) one or more initial display parameters to the mobile device 104. When the prototype 244 is initially executed, initial values of display parameters 248 of the prototype 244 are sent to the mobile device 104. The mobile device 104 receives (520) the initial display parameters and stores the initial values of the display parameters as display parameters 344 of application prototype data 338.

In some embodiments, display parameters include one or more of: an anchor point for an image; an x-dimensional position value, a y-dimensional position value, a z-dimensional position value, an x-dimensional rotation value, a y-dimensional rotation value, a z-dimensional rotation value, a width, a height, an opacity, a fill color, and a scale. For example, layer patch 404 in FIG. 4A includes inputs ("Anchor Point," "X Position," "Y Position," "Z Position," "X Rotation," "Y Rotation," "Z Rotation," "Width," "Height," "Opacity," "Color." "Scale") corresponding to the display parameters listed above. The initial values for these inputs in the layer patch 404 are definable by the user, and coupling of any of these inputs to an output of another patch causes the value for that input to vary in accordance with the coupled patch (e.g., vary with a swipe gesture interaction corresponding to a swipe patch 454, vary with a scroll animation corresponding to a scroll patch 418).

In some embodiments, information corresponding to layer(s) 248 of the prototype 244 is sent along with the initial values of the display parameters 252 to the mobile device 104. In some embodiments, information corresponding to layer(s) 248 is sent along with the associated images 246 to the mobile device 104.

In some embodiments, the images 246 may be sent to the mobile device 104 before or concurrently with sending the initial display parameters.

For example, FIG. 7B illustrates example layer tree data sent by the electronic device to the mobile device in accordance with some embodiments. The layer tree data 704 includes layer data 706-A corresponding to a first layer (e.g., a fill layer) and layer data 706-B corresponding to second layer, as well as hash data 708 of an image associated with a layer specified in the layer tree data 704 (e.g., with the second layer). The first layer data 706-A includes an identifier of the layer (e.g., "id=634478000"), and initial values of corresponding display parameters. The second layer data 706-B includes an identifier of the layer (e.g., "id=560442000"), a hash of an image (e.g., "image=acd72eb4eba5b56de5209b5b8ba9959") associated with the layer, and initial values of corresponding display parameters. The hash data 708 includes a hash 707 of an image and a layer identifier 705 of the layer with which the image corresponding to the hash 707 is associated. In some embodiments, the hash of an image in the layer data serves as the identifier of the image.

The mobile device 104 displays (524) image(s) in accordance with the initial display parameter(s). The prototype rendering module 332 renders and displays graphical output of the executing prototype 244 in accordance with the prototype data 338 at the mobile device 104.

In some embodiments, the application prototype data 338 is not the prototype 244 itself but rather data (e.g., content, parameters, content associations, etc.) necessary and sufficient for displaying graphical output, of the application prototype 244, that the user can interact with as if the prototype 244 is executed by the mobile device 104; execution of the prototype 244 is performed at the electronic device 102.

The mobile device 104 detects (526) user interactions. The prototype interaction module 334 detects user interaction with the displayed graphical output of the executing prototype at the mobile device 104 and generates corresponding data 346. The interactions may include, for example, gestures, activation of affordances in the graphical output (e.g., via gestures), text input, and so forth.

The mobile device 104 sends (528) user interaction data to the electronic device 102. The data communication module 336 at the mobile device 104 sends the user interaction data 346 to the electronic device 102. The electronic device 102 receives (530) the user interaction data. The data communication module 238 at the electronic device 102 receives the user interaction data 346.

The electronic device 102 determines (532) updated display parameter(s). The prototype user interactions module 240, including the gesture recognition module 241, determines the user interactions at the mobile device 104 (e.g., recognizes gestures) and one or more corresponding values (e.g., starting position, ending position, direction, speed, etc.) based on the received user interaction data 346. The prototype execution module 236 determines changes to the display parameters 252, and thus changes to the graphical output of the executing prototype 244, based on the determined user interactions and corresponding values, and updates the display parameters 252 accordingly. In some embodiments, the physics engine 237 determines any physics effects in the graphical output (e.g., scrolling inertia, bouncing at the end of a scrolling animation) in accordance with the determined user interactions, and updates the display parameters 252 accordingly.

The electronic device 102 sends (534) indication(s) of updated display parameter(s) to the mobile device 104. In lieu of sending the images and layers and values of the display parameters in their entirety, just indications of display parameters that have been updated are sent. In some embodiments, an indication of a respective updated display parameter includes the new, updated value of the respective display parameter. Thus, for example, for a position display parameter, the indication of the updated display parameter is the new position value. In some embodiments, absolute or actual values are sent for a respective parameter, as opposed to delta values (i.e., difference between old value and current value), to ensure synchronization. For example, FIG. 7C illustrates display parameter update data 710. Update data 710-1 thru 710-10 include respective updates to the y-dimensional position value of an image as the user interacts with the image that causes movement of the image and corresponding layer along the y-axis. Each update data 710 includes a layer identifier 705 of the layer affected and the new y-dimension position value 711 for the affected layer.

The mobile device 104 receives (536) the indications of updated display parameter(s). The data communication module 336 receives the indications of updated display parameters 252.

The mobile device 104 displays (538) the images in accordance with the updated display parameters. The prototype processing module 330 updates the display parameters 344 at the mobile device 104 in accordance with the indications of the updated display parameters. The prototype rendering module 332 displays the images 340 in accordance with the updated display parameters 344.

FIGS. 6A-6D are flow diagrams illustrating a method 600 of communicating application prototype information in accordance with some embodiments. FIGS. 6A-6D correspond to instructions stored in a computer memory or computer-readable storage medium (e.g., memory 206). In some embodiments, the method 600 is performed at an electronic device (e.g., electronic device 102) having one or more processors and memory storing instructions for execution by the one or more processors (602). The electronic device is communicatively coupled with a mobile device (e.g., mobile device 104) having a display (e.g., display 312). In some embodiments, the method 600 corresponds to the portions of the method 500 performed by the electronic device 102.

The electronic device receives (608) user inputs defining a prototype of an application for the mobile device. For example, prototype definition module 232 and user interface composition module 234 receives inputs (e.g., textual input corresponding to the user writing source code and/or the user adding patches to a definition and coupling patches) from a user defining a mobile app prototype (e.g., prototype 244).

The electronic device sends (612) one or more images for the prototype of the application to the mobile device for display in a user interface of the application. When the prototype 244 is initially executed, image(s) 246 of the prototype 244 are sent to the mobile device 104 for storage and eventual display. The mobile device 104 receives the images 246 and stores (e.g., caches) the received images as images 340 of application prototype data 338.

The electronic device sends (622) initial display parameters for the one or more images to the mobile device. When the prototype 244 is initially executed, initial values of display parameters 248 of the prototype 244 are sent to the mobile device 104. The mobile device 104 receives the initial values of the display parameters and stores the initial values as display parameters 344 of application prototype data 338.

The electronic device receives (630) user-interaction data from the mobile device corresponding to interaction of a user with the mobile device while the mobile device is displaying a respective image of the one or more images in accordance with the initial display parameters for the respective image. The mobile device 104 displays the images 340 in accordance with the initial values of the display parameters 344, and detects user interactions with the mobile device 104 (e.g., with the displayed images 340) while the images 340 are displayed. The mobile device 104 sends data corresponding to the user interactions (e.g., user interaction data 346) to the electronic device 102. The electronic device 102 (e.g., the data communication module 238) receives the user interaction data 346.

The electronic device determines (634) an updated display parameter for the respective image, in accordance with the user-interaction data. The prototype execution module 232 and physics engine 237 updates display parameter(s) 252 in accordance with the received user interaction data 346. For example, if the user interaction causes a change in the Y-axis position of an image, the Y-Position parameter of that image is updated.

The electronic device sends (636) an indication of the updated display parameter to the mobile device, where the mobile device is to display the respective image in accordance with the updated display parameter. The electronic device 102 sends indication(s) of updated display parameter(s) 252 to the mobile device 104. The mobile device 104 updates the display parameters 344 with the received indications of updated display parameters and displays the images 340 in accordance with the updated display parameters 344.

In some embodiments, the indication of the updated display parameter is sent to the mobile device without resending image data for the respective image. The indications sent include just the updated values themselves or corresponding deltas from the previous values. As the images of the prototype 244 have already been sent when the prototype 244 is initially executed, the images do not need to be sent again.

In some embodiments, the electronic device and the mobile device are communicatively coupled through a direct wired connection (604). For example, the communicative connection 106 may be a direct wired (e.g., cable, wire) connection.

In some embodiments, the direct wired connection comprises a universal serial bus (USB) (606). For example, the cable that communicatively connects 106 the electronic device 102 and mobile device 104 may be a USB-to-micro-USB cable or a USB-to-LIGHTNING cable, with the USB connector connected to a USB plug at the electronic device.

In some embodiments, before sending the one or more images and the initial display parameters to the mobile device, the electronic device performs (610) a handshake with the mobile device to identify the mobile device. The application prototyping module 230 at the electronic device 102 performs a handshake process with the prototype processing module 330 at the mobile device 104 in order to identify the mobile device 102, so that display of the images of the application prototype and the corresponding display parameters are tailored to the particular mobile device 104, whose model and operating system may affect display of the images (e.g., screen size variations by model may affect the upper and lower bounds of x-axis and y-axis positions).

In some embodiments, the one or more images comprise a plurality of images, and respective images of the plurality of images correspond to respective layers of the user interface (614). The images 246 include multiple images and correspond to respective layers of a graphical user interface of the prototype 244. For example, in prototype definition 430, the image patch 438 is coupled to the layer patch 434, and the image patch 446 is coupled to another layer patch 436. The image corresponding to image patch 438 corresponds to the layer corresponding to layer patch 434. The image corresponding to image patch 446 corresponds to the layer corresponding to layer patch 436.

In some embodiments, sending the initial display parameters includes sending a layer tree to the mobile device, where the layer tree specifies the initial display parameters for each image of the plurality of images using an identifier for each image of the plurality of images (624), and sending the one or more images includes, for each image of the plurality of images, sending an image file tagged with the identifier for the image (616). The electronic device 102 sends a layer tree that specifies the layers of the prototype, as well as the images, to the mobile device 104. The layer tree specifies the one or more layers of the prototype, the respective z-order or layer hierarchy positions, and corresponding initial display parameters for the associated images. For example, the layer tree for definition 400-1 specifies layers corresponding to layer patches 402 and 404 and includes corresponding display parameters. Layer tree data 704 (FIG. 7B) includes layer data 706-A specifying a first layer and corresponding initial display parameters, and layer data 706-B specifying a second layer and corresponding initial display parameters. The second layer data 706-B includes a hash 707 of an associated image that also serves as an identifier of the associated image. As much layer data 706 as needed to specify the layers of the prototype may be included in the layer tree data 704.

In some embodiments, when the electronic device 102 sends an image 246 to the mobile device 104, the image is sent tagged with an identifier (e.g., a hash of the image).

In some embodiments, the electronic device generates (618) a hash value for each image of the plurality of images using a hashing function, where the identifier for each image of the plurality of images is the hash value. The hashing module 242 generates hashes of the image(s) 246.

In some embodiments, the electronic device uses (620) the hash values of the plurality of images to synchronize images between the electronic device and the mobile device. The electronic device 102 and the mobile device 104 use the hashes of the images to synchronize images 246 at the electronic device 102 with images 340 at the mobile device 104. In some embodiments, the hash values for synchronizing images may be sent as new images are sent (e.g., full set of image hash values are sent along with new images to the mobile device 104).

In some embodiments, sending the layer tree is performed before sending the one or more images (626). Thus, in FIG.

5A, sending of the layer tree data is performed before sending of the images (step 514).

In some embodiments, the initial display parameters are selected from the group consisting of: an anchor point for an image; an x-dimensional position value, a y-dimensional position value, a z-dimensional position value, an x-dimensional rotation value, a y-dimensional rotation value, a z-dimensional rotation value, a width, a height, an opacity, a fill color, and a scale (628). A layer patch (e.g., patch 404, FIG. 4A) of a layer and corresponding layer data (e.g., layer data 706) includes one or more display parameters that affect the display of an image associated with the layer. The parameters include, for example, position values in the three dimensional axes, rotational values in the three dimensional axes, width, height, opacity, a solid color that fills the layer, and a scale (e.g., zoom level).

In some embodiments, the display of the mobile device is a touch-sensitive display, and the user-interaction data corresponds to a gesture detected on the touch-sensitive display (632). The mobile device 104, for example, may have a touch-sensitive display 312 with a touch-sensitive surface 314. Interactions with the prototype graphical output displayed at the mobile device 104 include gestures detected on the touch-sensitive display (e.g., swipe gestures, etc.).

In some embodiments, sending the indication of the updated display parameter to the mobile device comprises sending the value of the updated display parameter to the mobile device (638). The electronic device 102 sends updated values of display parameters 252 that have been updated in accordance with the user interactions to the mobile device 104. In some embodiments, the updated values sent are absolute or actual values (e.g., actual coordinate position value as opposed to a delta from the previous position value). Sending absolute/actual values instead of deltas values helps keep the electronic device 102 and the mobile device 104 synchronized with respect to the display parameters; sending absolute/actual values is more robust against error accumulation due to lost data packets than sending deltas.

In some embodiments, the electronic device determines (640) that the user-interaction data corresponds to a scroll operation for a respective image of the one or more images, repeatedly updates (642) y-dimensional position values in accordance with the scroll operation, and repeatedly sends (644) the updated y-dimensional position values to the mobile device in accordance with the scroll operation. For example, the prototype may include a scrolling operation or animation (e.g., scroll patch 418 in definition 400-2, FIG. 4C). When the user interaction activates the scrolling operation for an image in the prototype, the electronic device updates the position value for the dimension associated with the scrolling operation by the prototype. If the scrolling operation is defined in the prototype to affect the y-dimension, the y-dimensional position value is repeatedly updated in accordance with the scrolling, and the updated values are repeatedly sent to the mobile device 104. Update data 710 illustrates an example of a repeatedly updated position value (in the case of update data 710 as shown in FIG. 7C, y-dimensional position value), where the updated values are repeatedly sent to the mobile device 104. Each of update data 710-1 thru 710-10 sent to the mobile device 104 is a respective updated value during a scrolling operation (e.g., scrolling caused by a swipe gesture).

In some embodiments, the electronic device, after sending an updated y-dimensional position value, waits (646) for a confirmation of receipt from the mobile device, and sends (648) a successive updated y-dimensional position value after receiving the confirmation of receipt. For example, the electronic device 102, after sending an updated y-dimension position value (e.g., update data 710-1) to the mobile device 104, waits for a confirmation of receipt of the sent updated value from the mobile device 104 before sending the next updated value (e.g., update data 710-2).

Figure 7D:
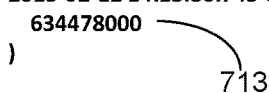
Figure 7D:
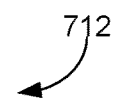

In some embodiments, the electronic device (650) sends a message to the mobile device to delete a layer, where the message specifies the identifier for the image corresponding to the layer. The user may, using the prototype definition module 232, modify the definition of the prototype 244, even while the prototype is being executed. For example, the user may delete a patch from the prototype definition. When the deleted patch is a layer patch, the application prototyping module 230 sends a message to the mobile device 104, particularly the prototype processing module 330 to delete a layer 343 corresponding to the deleted layer patch. The message includes an identifier of the layer being deleted and optionally an identifier of the image corresponding to the layer. FIG. 7D illustrates an example layer deletion message 712. The layer deletion message 712 includes an identifier 713 of the layer to be deleted. The layer deletion message 712 for deleting a layer may be sent by the application prototyping module 230 after (e.g., immediately after) the user modifies the prototype definition to delete the layer and saves the modified definition.

In some embodiments, the instructions include (652) instructions for a user-interface-composition utility; and receiving the user inputs includes (654), in the user-interface-composition utility, receiving (656) a user input selecting an image patch for each image of the one or more images, receiving (658) a user input selecting a layer patch of each image of the one or more images, and for each image of the one or more images, receiving (660) a user input coupling an image output of the respective image patch to an image input of the respective layer patch. The application prototyping module at the electronic device 102 includes, for example, a user interface composition module 234 that provides a graphical user interface in which the user can create or modify a prototype definition by adding and removing patches, inputting values for parameters of a patch, and coupling patches. The prototype definition includes one or more image patches (e.g., image patches 438, 446 in definition 430, FIG. 4E) selected by the user (e.g., clicked on by the user) coupled to respective layer patches selected by the user (e.g., layer patches 434, 436) by respective lines (e.g., lines 442, 450).

In some embodiments, receiving the user inputs includes receiving (662) a user input selecting an animation patch, and receiving (664) user inputs coupling the animation patch between the image output of a respective image patch and a display-parameter input of a respective layer patch, where the animation patch corresponds to a predefined animation. For example, definition 400-2 includes a scroll animation patch 418 selected by the user and coupled to the image output 408 of image patch 406 on one end and to the Y Position input 424 of layer patch 404 on the other end.

In some embodiments, receiving the user inputs includes receiving (666) a user input selecting an interaction patch, the interaction patch corresponding to one or more predefined user interactions with the mobile device; receiving (668) a user input selecting a transition patch; receiving (670) a user input coupling the interaction patch to the transition patch, the transition patch to generate output values corresponding to a user interaction with the mobile device; and receiving (672) a user input coupling the transition patch with a layer patch, the transition patch to provide the output values to a display-parameter input of the layer patch. For example, definition 430 includes a swipe interaction patch 454 selected by the user and coupled to the progress inputs 470 and 478 of transition patches 456 and 458, respectively. The definition 430 also includes the transition patch 456 coupled to the opacity input 474 of layer patch 434, and the transition patch 458 coupled to the scale input 482 of layer patch 434.

FIGS. 7A-7D are exemplary application prototype information sent from an electronic device in accordance with some embodiments. FIG. 7A illustrates an example device identification confirmation 702. The confirmation 702 includes information such as device model, whether the device is a tablet computer or not, whether the device is a high-resolution display (e.g., retina display), and the operating system name and version.

FIG. 7B illustrates example layer tree data. The layer tree data 704 includes layer data 706-A corresponding to a first layer and layer data 706-B corresponding to second layer, as well as hash data 708 of an image associated with a layer specified in the layer tree data 704. The first layer data 706-A includes an identifier 713 of the layer and initial values of corresponding display parameters. The second layer data 706-B includes an identifier 705 of the layer, a hash 707 of an image associated with the layer, and initial values of corresponding display parameters. The hash data 708 includes a hash 707 of an image and a layer identifier 705 of the layer with which the image corresponding to the hash 707 is associated. In some embodiments, the hash of an image in the layer data also serves as the identifier of the image.

FIG. 7C illustrates example display parameter update data 710. Update data 710-1 thru 710-10 include respective updates to the y-dimensional position value of an image as the user interacts with the image to cause movement of the image and corresponding layer along the y-axis. Each update data 710 includes a layer identifier 705 of the layer affected and the new y-dimension position value 711 for the affected layer.

FIG. 7D illustrates an example layer deletion message 712. The layer deletion message 712 includes an identifier 713 of the layer to be deleted and optionally an identifier of an image corresponding to the layer to be deleted.

In some embodiments, images 340 at the mobile device 104 are cleared in accordance with a cache-clearing rule (e.g., the least-recently displayed image amongst the images 340 is removed periodically). The electronic device 102 may resend the cleared image to the mobile device 102 when the graphical output requires the image.

Figure 8A:
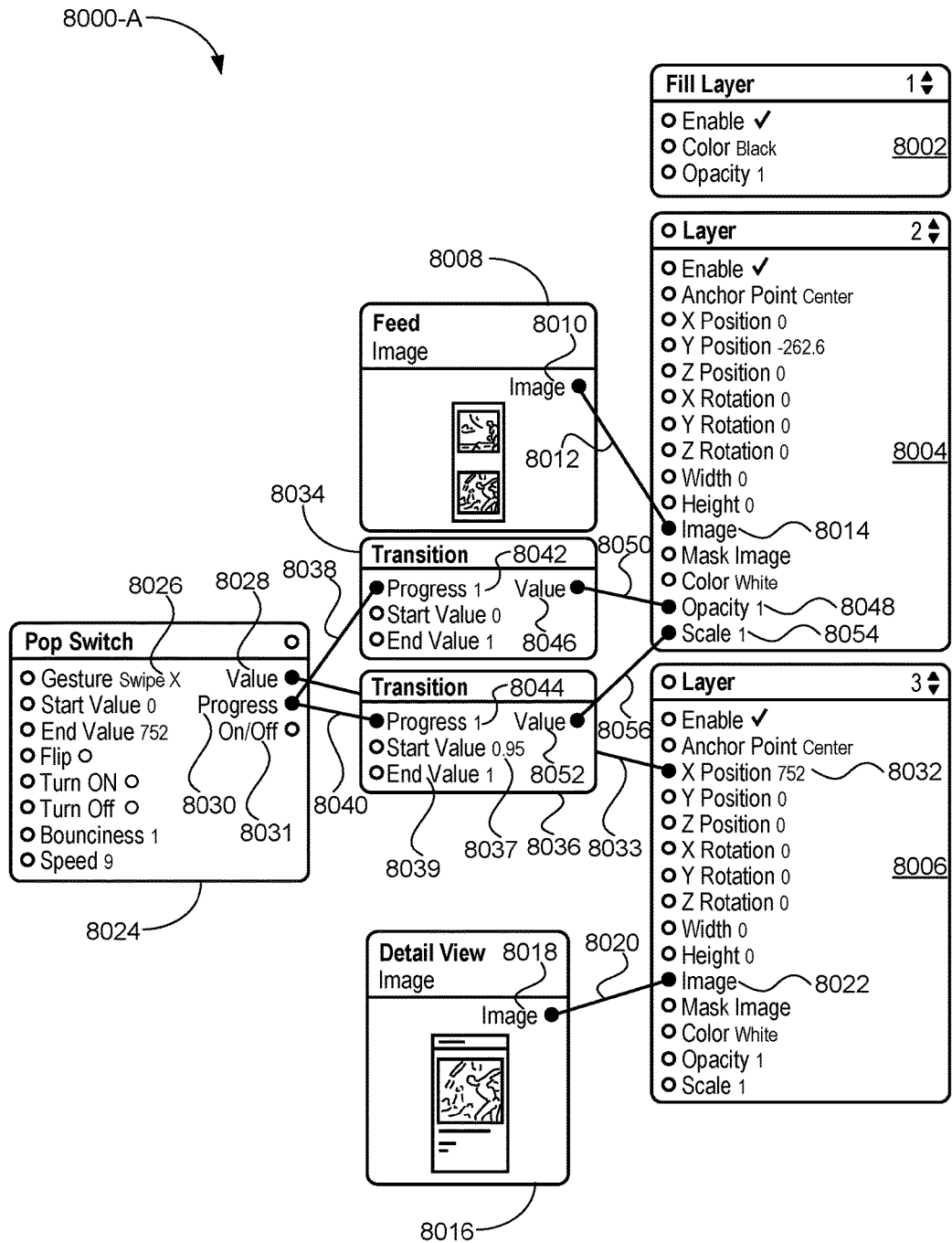
FIGS. 8A-8E illustrate additional exemplary application prototype definitions as displayed in an exemplary user interface composition utility and corresponding application prototype user interfaces in accordance with some embodiments.

FIGS. 8A-8G illustrate additional exemplary application prototype definitions as displayed in an exemplary user interface composition utility and corresponding application prototype user interfaces in accordance with some embodiments. FIG. 8A illustrates an application prototype definition 8000-A of an application. Definition 8000-A defines a user interface of the application prototype. Definition 8000-A includes fill layer patch 8002 and layer patches 8004 and 8006. The fill layer corresponding to fill layer patch 8002 is lowest in the z-order, followed in order by the layer corresponding to patch 8004 and the layer corresponding to patch 8006.

Definition 8000-A includes image patches 8008 and 8016. The image output 8010 of image patch 8008 is coupled to the image input 8014 of layer patch 8004 by line 8012; the image associated with image patch 8008 is thereby associated with the layer corresponding to layer patch 8004. The image output 8018 of image patch 8016 is coupled to the image input 8022 of layer patch 8006 by line 8020; the image associated with image patch 8016 is thereby associated with the layer corresponding to layer patch 8006.

Definition 8000-A also includes a "pop switch" patch 8024. In some embodiments, a pop switch patch is a patch for defining a gesture interaction with multiple parameters. The pop switch patch is a generic patch; the pop switch patch is configurable to define a gesture interaction based on any of multiple gesture types. For example, pop switch patch 8024 includes a user-configurable input "Gesture" 8026 that may be set to any of multiple gesture types (e.g., swipe, pinch, de-pinch, rotate, etc.). Based on the gesture set for the "Gesture" parameter 8026, the pop switch patch 8024 defines a gesture interaction corresponding to the gesture type set for the "Gesture" parameter 8026. For example, the gesture parameter 8026 of pop switch 8024 is set to "Swipe X"; pop switch 8024 thus defines a horizontal swipe gesture interaction.

Pop switch patch 8024 includes one or more additional inputs, the values of which are configurable by the user. Examples of such inputs include a start value, an end value (the start value and the end value defining a range of values that the pop switch patch can provide to another patch in accordance with the defined gesture interaction), a "flip" toggle, a "turn on" toggle, a "turn off" toggle, a bounciness value, and a speed value. Pop switch patch 8024 also includes one or more outputs, including for example a value output 8028, a progress output 8030, and an on/off output 8031. In FIG. 8A, the value output 8028 is coupled to the "X Position" input 8032 of layer patch 8006 by line 8033; the gesture defined by pop switch patch 8024 thus controls the x-position value of the layer corresponding to layer patch 8006.

Progress output 8030 is concurrently coupled to respective inputs of transition patches 8034 and 8036. Particularly, progress output 8030 is concurrently coupled to the progress input 8042 of transition patch 8034 by line 8038, and to the progress input 8044 of transition patch 8036 by line 8040. The value output 8046 of transition patch 8034 is coupled to the opacity input 8048 of layer patch 8004 by line 8050; the gesture defined by pop switch patch 8024 thus causes transitions in the opacity of the layer corresponding to layer patch 8004. The value output 8052 of transition patch 8036 is coupled to the scale input 8054 of layer patch 8004 by line 8056; the gesture defined by pop switch patch 8024 thus causes transitions in the scale of the layer corresponding to layer patch 8004. A transition patch may also include other inputs (e.g., start value parameter 8037, end value parameter 8039).

Figure 8B:
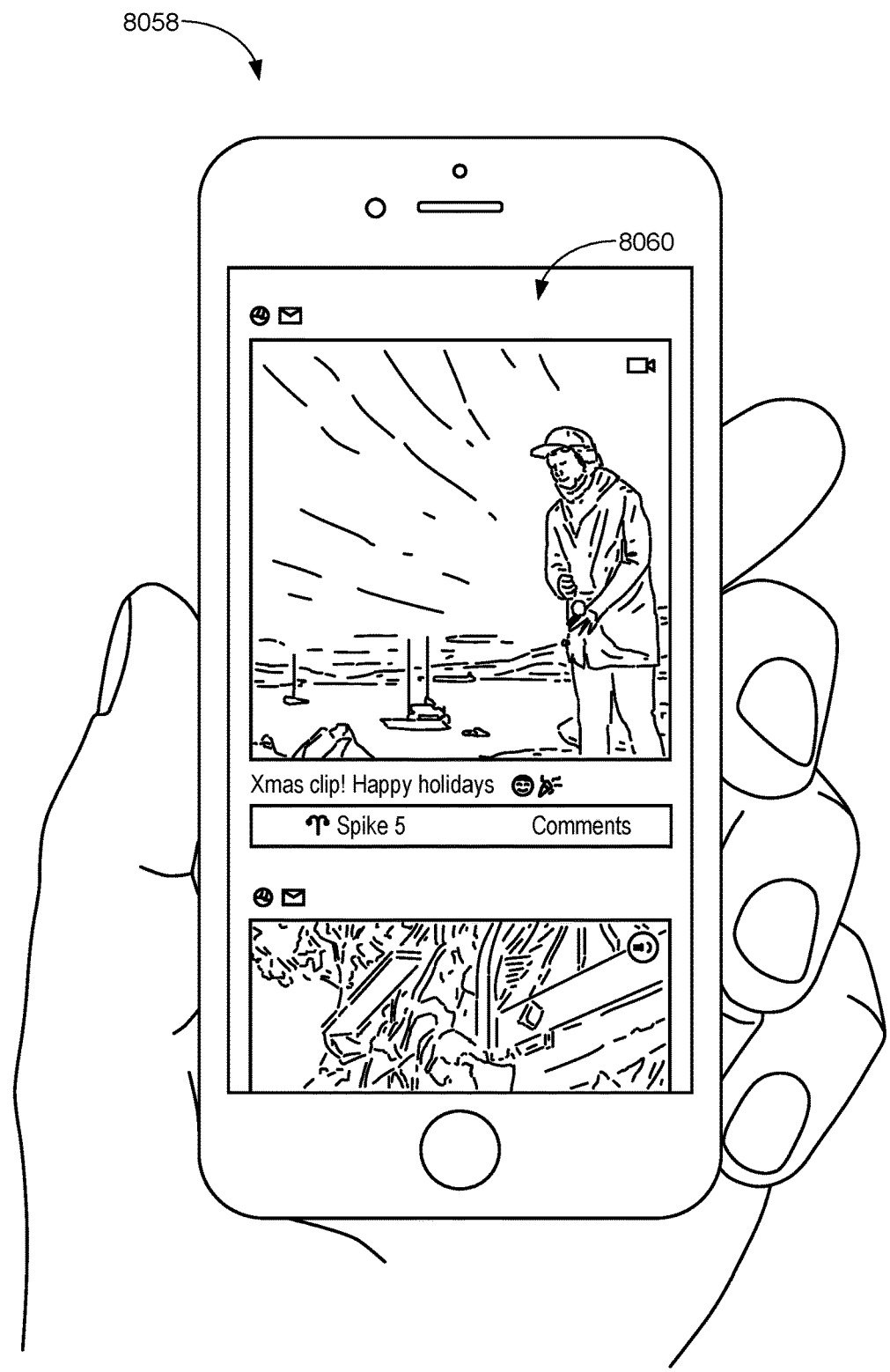

FIG. 8B illustrates an example graphical output when the application prototype corresponding to definition 8000-A is executed. In some embodiments, the graphical output is displayed on the mobile device 104 by the prototype processing module 330 (e.g., the prototype rendering module 332). In some embodiments, displaying of the graphical output at the mobile device 104 is simulated or mirrored at the electronic device 102 by the application prototyping module 230. The application prototyping module 230 displays, at the electronic device 102, a mock mobile device that shows the graphical output displayed within; displaying the mock mobile device and displaying the graphical output in the mock mobile device simulates the mobile device 104 displaying the graphical output. Thus, the mobile device 8058 in FIG. 4B may be the actual mobile device 104 or the mock mobile device displayed at the electronic device 102.

When the application prototype corresponding to definition 8000-A is executed, the image corresponding to image patch 8008 is displayed above a color layer corresponding to the fill layer patch 8002. Thus, in FIG. 8B, a content feed image 8060 corresponding to the image patch 8008 is displayed in the mobile device 8058 over a color fill layer corresponding to the layer patch 8002; the color fill layer may be hidden by the content feed image 8058. In response to a swipe gesture (not shown) matching the swipe gesture interaction defined by pop switch patch 8024, an image (not shown) corresponding to image patch 8016 is moved into view and displayed over image 8060.

Figure 8C:
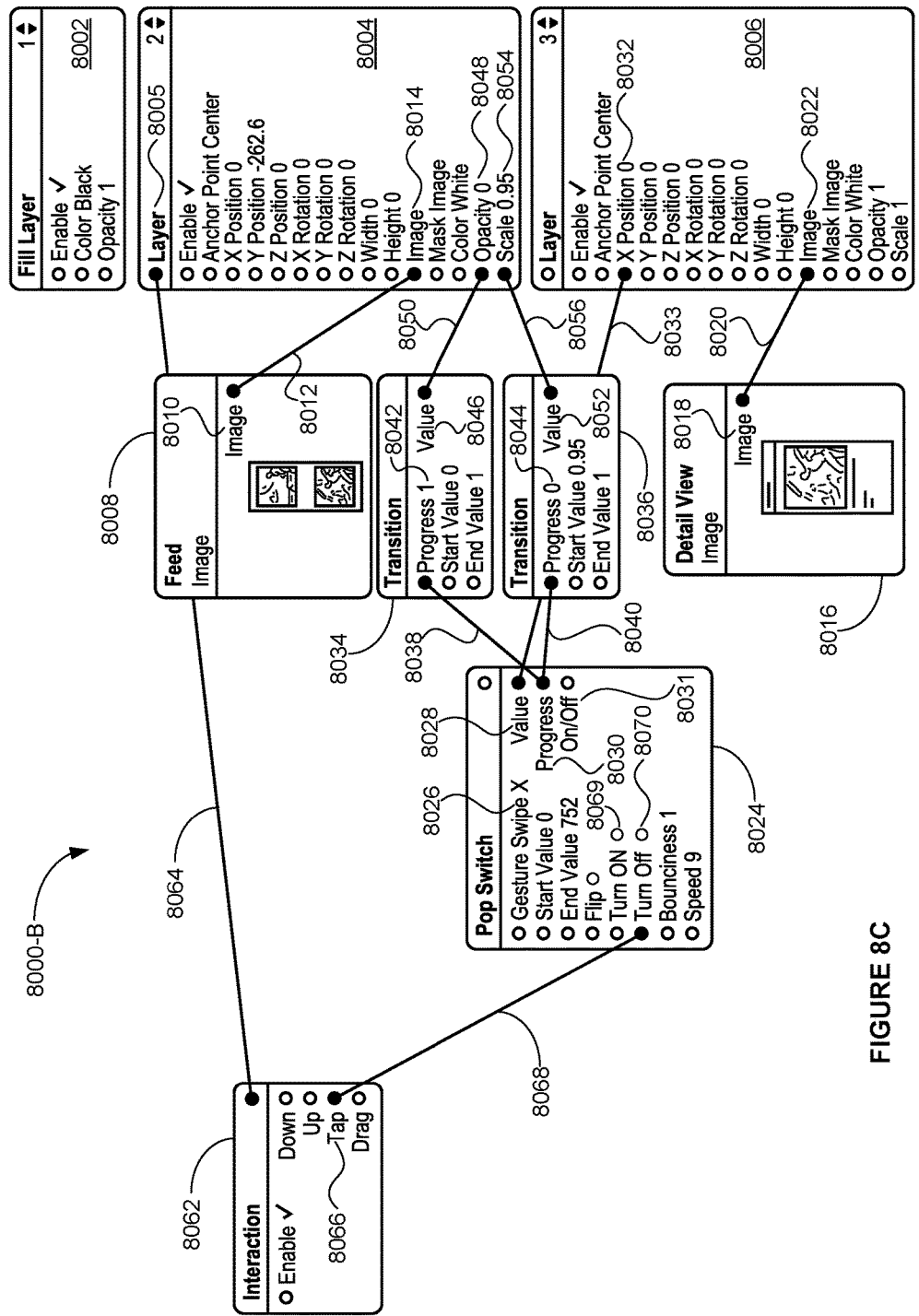

FIG. 8C illustrates an application prototype definition 8000-B. Definition 8000-B includes the patches and output-to-input couplings in definition 8000-A, described above and not repeated here, and includes an additional "Interaction" patch 8062. The interaction patch 8062 is coupled to a layer input 8005 of layer patch 8004 by line 8064. A "Tap" output 8066 of interaction patch 8062 is coupled to a "Turn Off" input 8070 of pop switch patch 8024 by line 8068. The interaction patch 8062 as illustrated in FIG. 8C, along with the couplings described above, define a tap gesture interaction that affects only the layer corresponding to layer patch 8004, specifically a tap gesture interaction that turns off, cancels, or reverses the effects of a gesture interaction corresponding to the pop switch patch 8024.

Figure 8D:

FIG. 8D illustrates an example graphical output when the application prototype corresponding to definition 8000-B is executed. When the application prototype corresponding to definition 8000-B is executed, in response to a gesture matching the gesture interaction defined by pop switch patch 8024 detected while an image corresponding to image patch 8008 is displayed, a content post image 8072 corresponding to image patch 8016 is displayed in accordance with the defined gesture interaction and the transitions defined by transition patches 8034 and 8036, as shown in FIG. 8D. In response to a tap gesture (not shown) matching the tap gesture interaction defined by interaction patch 8062, image 8072 is removed from display in accordance with cancellation of the effects of the gesture interaction defined by the pop switch patch 8024.

Figure 8E:
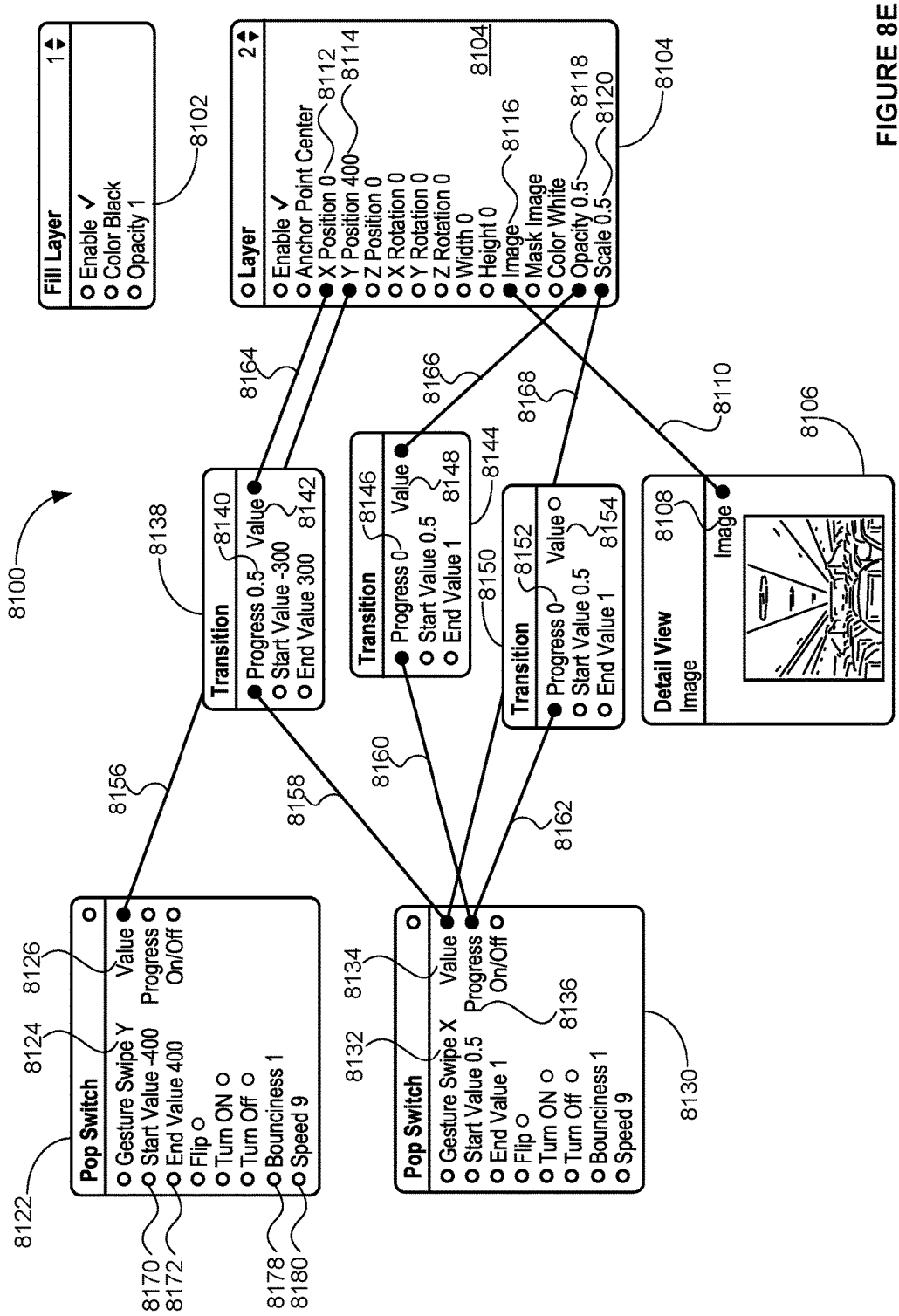

FIG. 8E illustrates an application prototype definition 8100 of an application. Definition 8100 defines a user interface of the application prototype. Definition 8100 includes fill layer patch 8102 and layer patch 8104. The fill layer corresponding to fill layer patch 8102 is lowest in the z-order, followed by the layer corresponding to patch 8104.

Definition 8100 includes an image patch 8106. The image output 8108 of image patch 8106 is coupled to the image input 8116 of layer patch 8104 by line 8110; the image associated with image patch 8106 is thereby associated with the layer corresponding to layer patch 8104.

Definition 8100 includes pop switch patches 8122 and 8130. Pop switch patch 8122 defines a "Swipe Y" vertical swipe gesture interaction in accordance with gesture parameter 8124. Pop switch patch 8130 defines a "Swipe X" horizontal swipe gesture interaction in accordance with gesture parameter 8132. Pop switch 8122 includes, among multiple inputs/parameters, a start value parameter 8170, an end value parameter 8172, a bounciness parameter 8178, and a speed parameter 8180.

The pop switch patches 8122 and 8130 are associated with layer patch 8104. The value output 8126 of pop switch patch 8122 is coupled to the "Y Position" input 8114 of layer patch 8104 by line 8156; the gesture interaction defined by pop switch patch 8122 thus provides a value to the y-position parameter of the layer corresponding to layer patch 8104.

The value output 8134 of pop switch patch 8130 is concurrently coupled to the progress input 8140 of transition patch 8138 by line 8158, and to the scale input 8120 of layer patch 8104 by line 8168. The gesture interaction defined by pop switch 8130 thus provides a value to transition patch 8138 and to the scale parameter of the layer corresponding to layer patch 8104.

The progress output 8136 of pop switch patch 8130 is concurrently coupled to the progress input 8146 of transition patch 8144 by line 8160, and to the progress input 8152 of transition patch 8150 by line 8162; the gesture interaction defined by pop switch 8130 provides a progress value to transition patches 8144 and 8150.

The value output 8142 of transition patch 8138 is coupled to the "X Position" input 8112 of layer patch 8104; the transition patch 8138 thus provides a value to the x-position parameter of the layer corresponding to layer patch 8104. The value provided by the transition patch 8138 to the "X Position" input 8112 is based on the gesture interaction defined by pop switch patch 8130; the transition patch 8138 defines a conversion of the value from value output 8134 of pop switch patch 8130 to a value in a different range (e.g., a range defined by user-configurable start and end value parameters of the transition patch 8138) for provision to another patch.

The value output 8148 of transition patch 8144 is coupled to the "Opacity" input 8118 of layer patch 8104; the transition patch 8144 thus provides a value to the opacity parameter of the layer corresponding to layer patch 8104. The value provided by the transition patch 8144 to the "Opacity" input 8118 is based on the gesture interaction defined by pop switch patch 8130; the transition patch 8144 defines a conversion of the value from progress output 8136 of pop switch patch 8130 to a value in a different range (e.g., a range defined by user-configurable start and end value parameters of the transition patch 8144) for provision to another patch.

Thus, definition 8100 defines a user interface that facilitates a vertical swipe gesture interaction that affects the y-position of the layer corresponding to layer patch 8104. Definition 8100 also defines a horizontal swipe gesture interaction that affects the scale of the layer corresponding to layer patch 8104 and, via transitions, affects the x-position and the opacity of the layer corresponding to layer patch 8104.

Figure 8F:
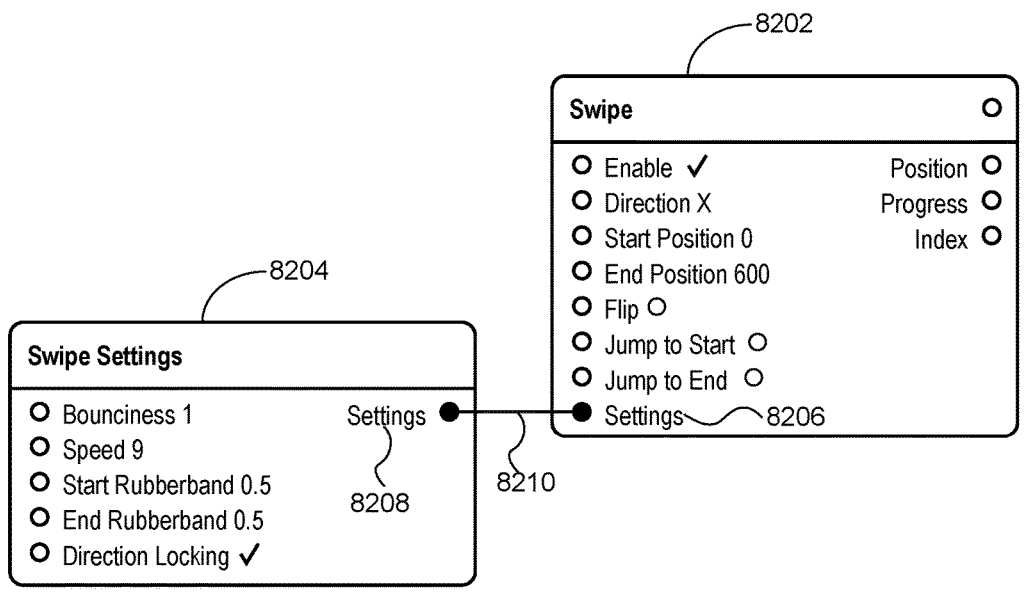
FIGS. 8F-8G illustrate example gesture interaction patches and associated configuration patches, in accordance with some embodiments.
Figure 8G:
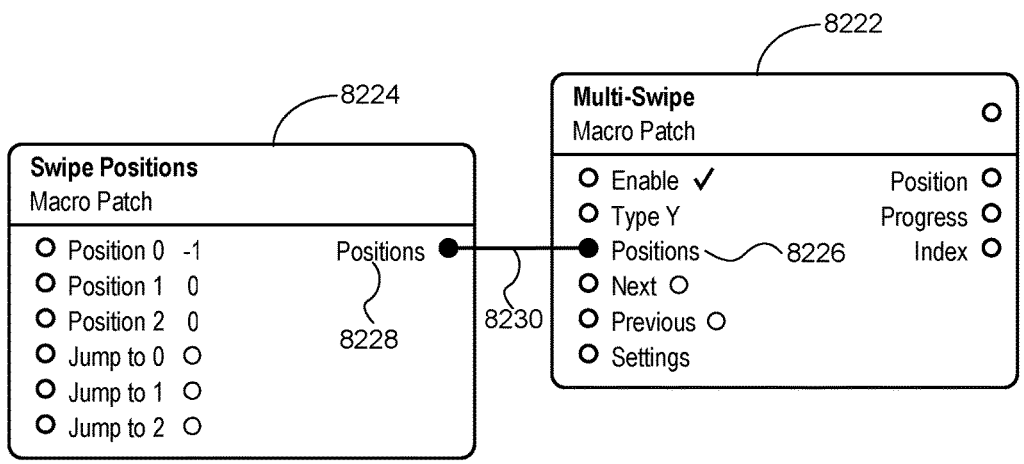
Figure 9A:
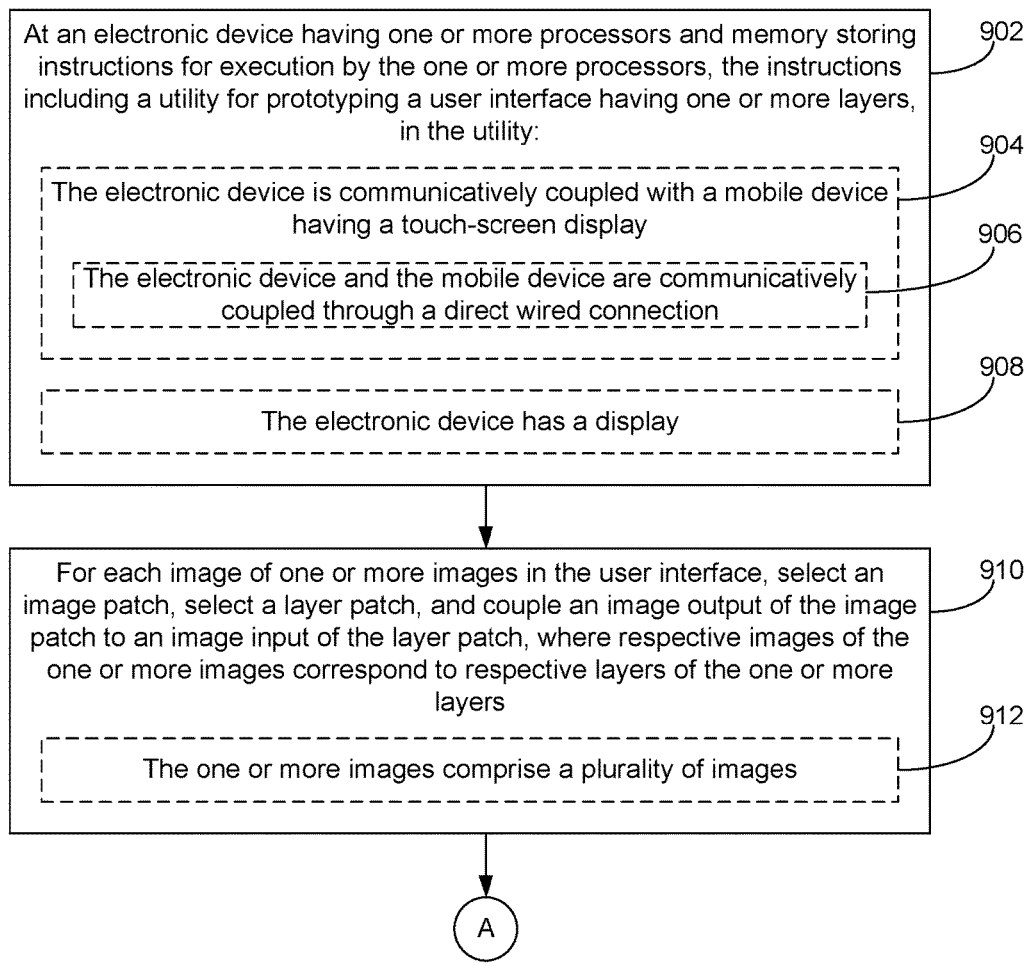
FIGS. 9A-9F are flow diagrams illustrating a method of defining gestures for a user interface in accordance with some embodiments.
Figure 9B:
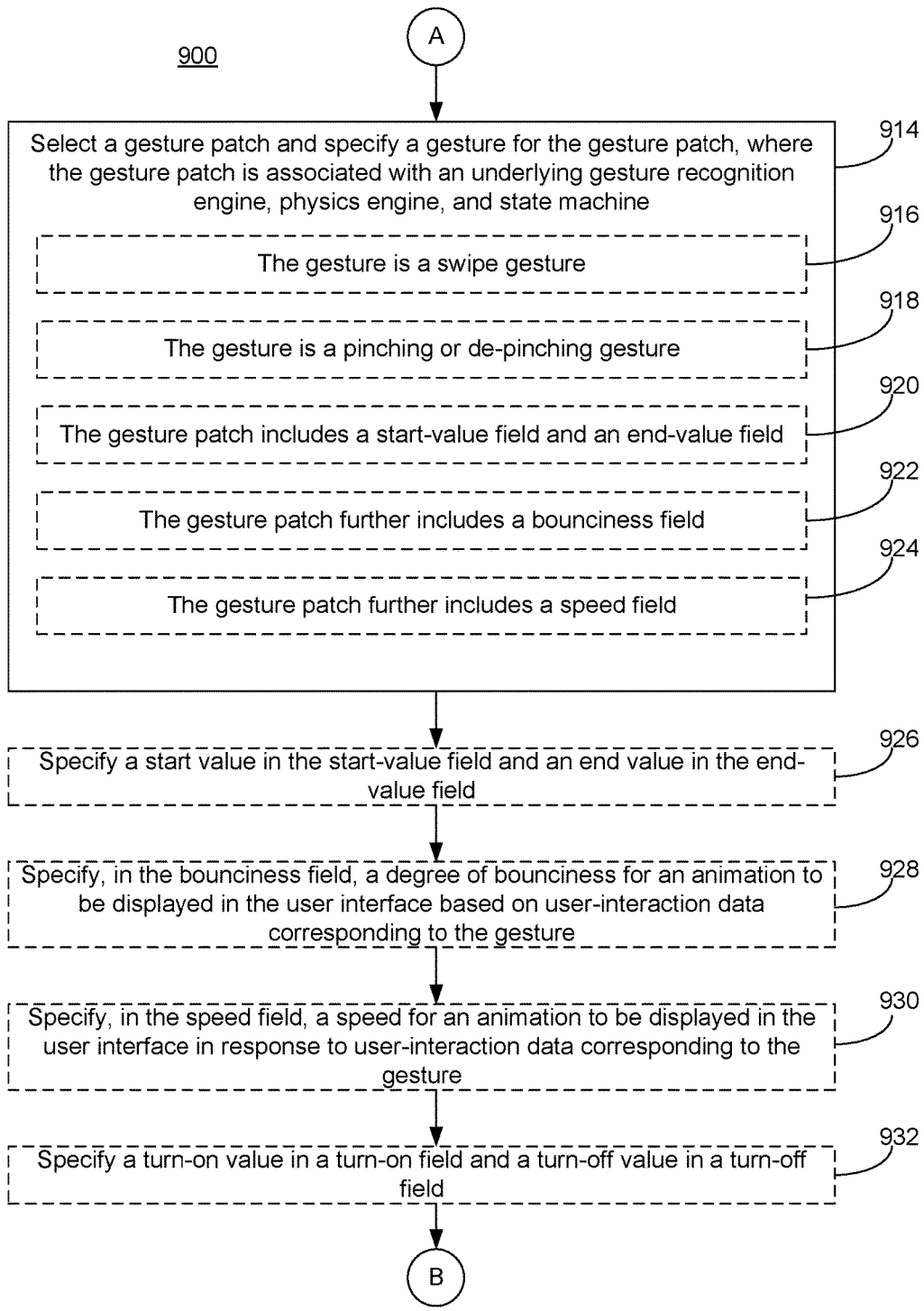
Figure 9C:
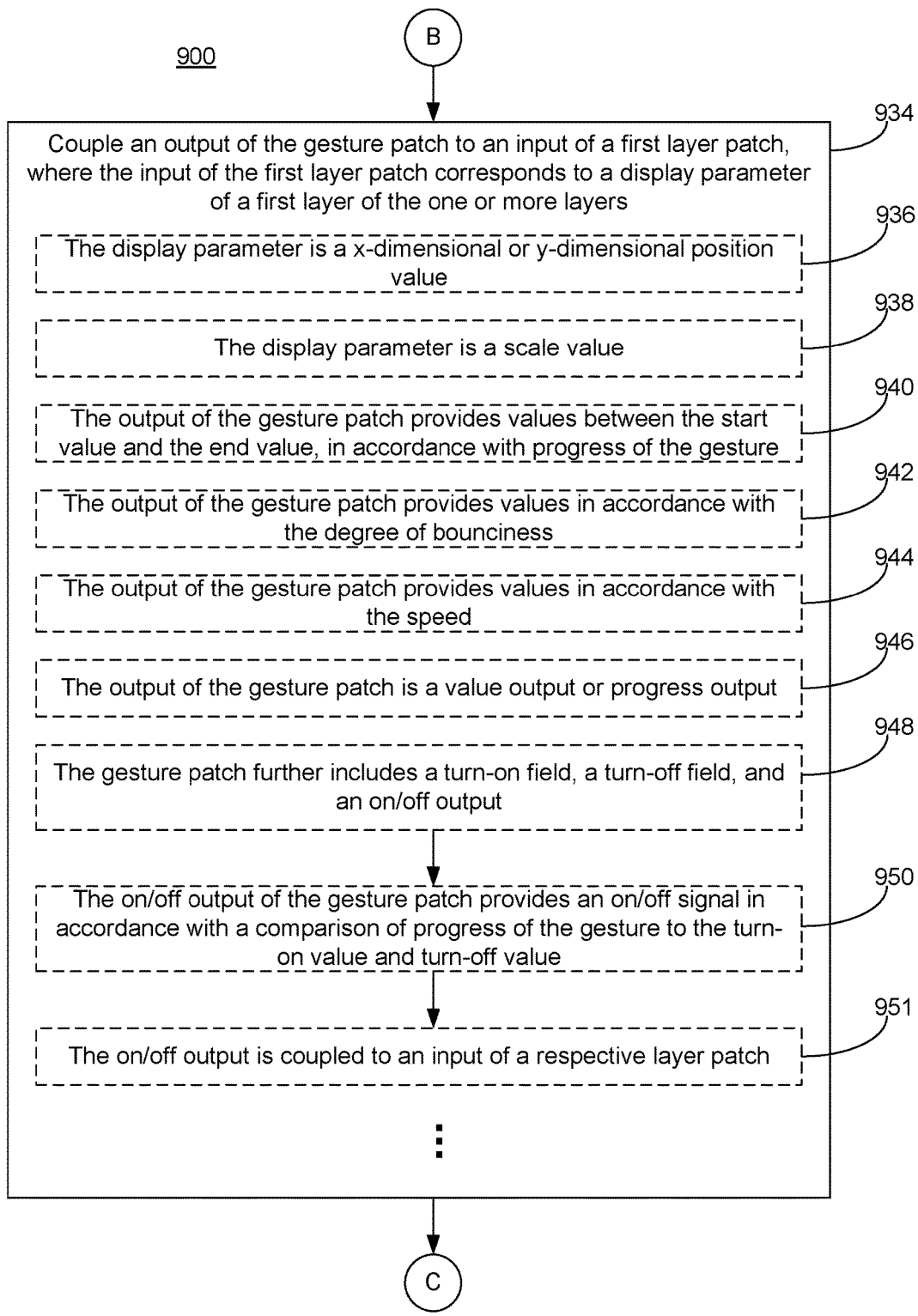
Figure 9D:
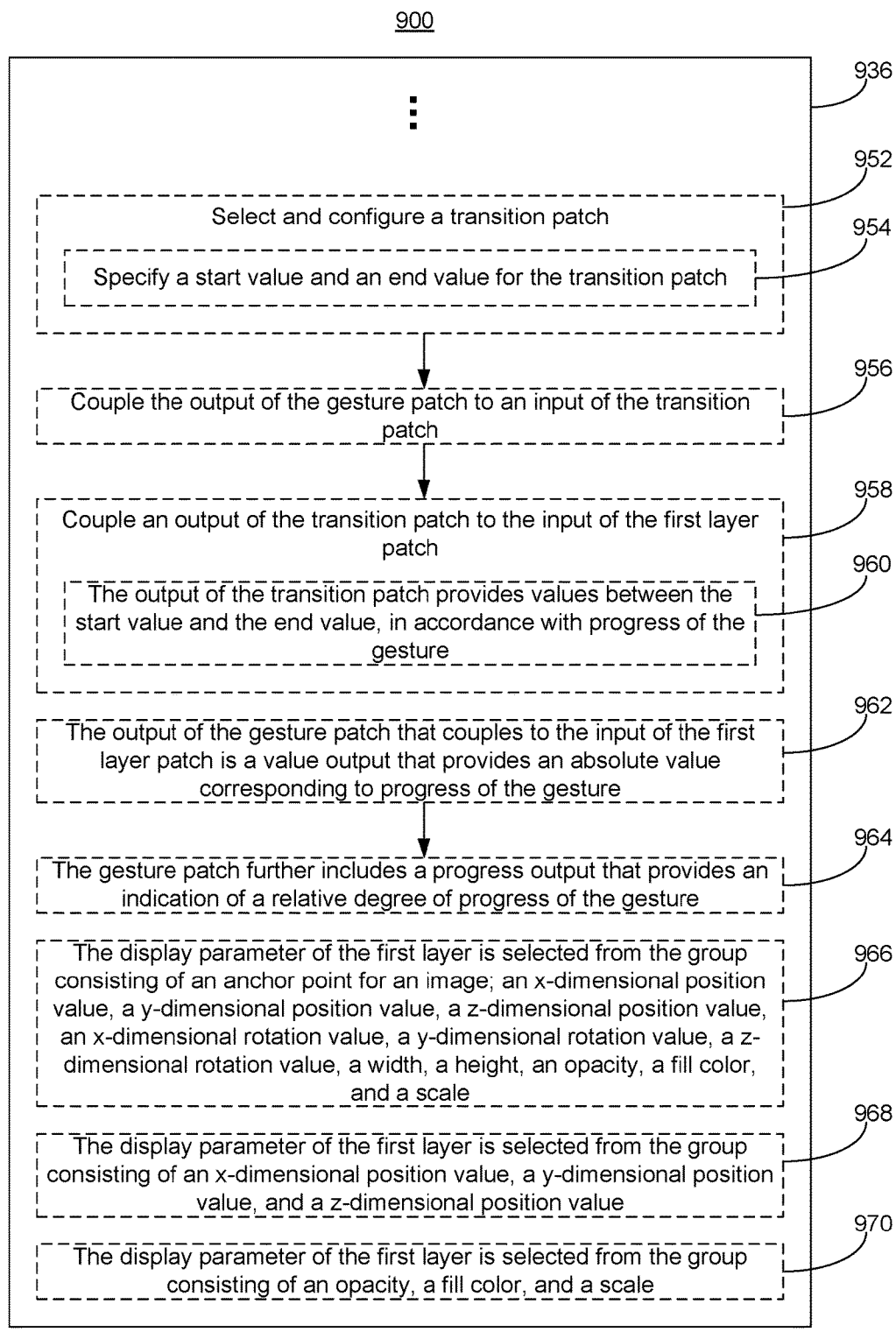
Figure 9E:
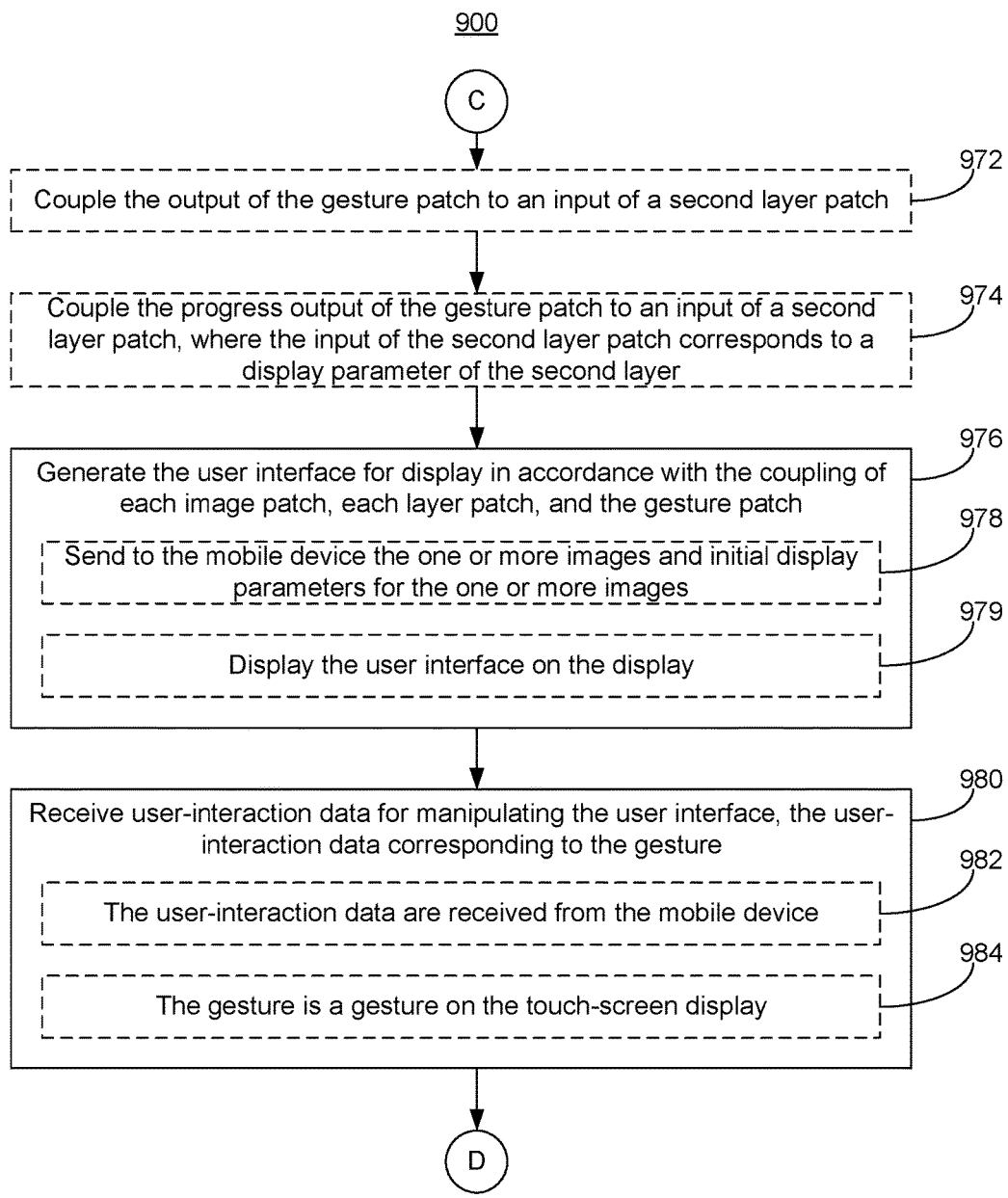
Figure 9F:
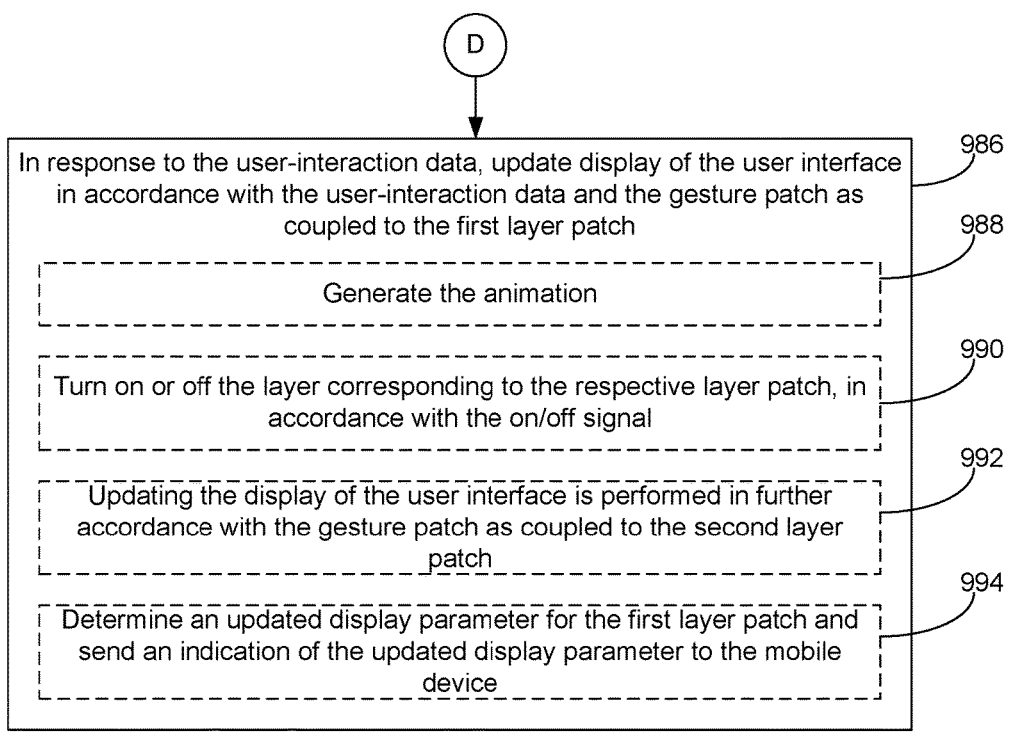

FIGS. 8F and 8G illustrate example gesture interaction patches and associated configuration patches, in accordance with some embodiments. These patches may be a part of any application prototype definition (e.g., definition 8000, definition 8100, etc.). For example, these patches compose a pop switch patch.

FIG. 8F illustrates a swipe gesture patch 8202. The swipe gesture patch 8202 is pre-customized to swipe gestures, with inputs specific to swipe gestures. Swipe gesture patch 8202 also includes a "Setting" input 8206 that can be coupled to the output of a configuration patch, for example a "Swipe Settings" patch 8204. In some embodiments, a configuration patch is a patch that is used to provide a configuration or settings for another patch (e.g., a gesture interaction patch). Swipe settings patch 8204 includes a "Settings" output 8208 that is coupled to the patch to which the configuration applies. In FIG. 8F, settings output 8208 is coupled to settings input 8206 by line 8210. Swipe settings patch 8204 includes one or more user-configurable parameters, such as a bounciness value, a speed value, starting and ending rubberband values for defining a rubberbanding graphical effect, and a direction locking toggle.

FIG. 8G illustrates a "Multi-Swipe" patch 8222 that includes, among multiple inputs, a "Positions" input 8226; the "Multi-Swipe" patch 8222 defines a swipe gesture interaction that may include multiple positional iterations. "Swipe Positions" patch 8224 is a configuration patch that may be used to define the positional iterations. "Swipe Positions" patch 8224 includes a "Positions" output 8228 that is coupled to the "Positions" input 8226 by line 8230. "Swipe Positions" patch 8224 includes multiple user-configurable parameters for defining the positional iterations, such as "Position 0," "Position 1," "Position 2," and toggles "Jump to 0," "Jump to 1," and "Jump to 2."

FIGS. 9A-9F are flow diagrams illustrating a method 900 of defining gestures for a user interface in accordance with some embodiments. FIGS. 9A-9F correspond to instructions stored in a computer memory or computer-readable storage medium (e.g., memory 206). In some embodiments, the method 900 is performed at an electronic device (e.g., electronic device 102) having one or more processors and memory storing instructions for execution by the one or more processors, the instructions including a utility (e.g., application prototyping module 230) for prototyping a user interface having one or more layers (902). In some embodiments, the method 900 is performed in the utility for prototyping a user interface having one or more layers (902). The electronic device is communicatively coupled with a mobile device (e.g., mobile device 104) having a display (e.g., display 312).

For each image of one or more images in the user interface, the electronic device selects (910) an image patch, selects a layer patch, and couples an image output of the image patch to an image input of the layer patch (e.g., in accordance with user input), where respective images of the one or more images correspond to respective layers of the one or more layers. For example, with respect to definition 8000, the electronic device 102, in the user interface composition module 234, selects an image patch (e.g., image patch 8008) in accordance with user selection, selects a layer patch (e.g., layer patch 8004) in accordance with user selection, and couples (e.g., with line 8012) the image output of the image patch (e.g., image output 8010) to an image input of the layer patch (e.g., image input 8014) in accordance with user input. Similarly, the electronic device 102 also selects image patch 8016 and layer patch 8006, and couples image output 8018 of image patch 8016 to image input 8022 of layer patch 8006 with line 8020, in accordance with user input.

The electronic device selects (914) a gesture patch and specifies a gesture for the gesture patch (e.g., in accordance with user input), where the gesture patch is associated with an underlying gesture recognition engine, physics engine, and state machine. The electronic device 102, in accordance with user input, selects a gesture patch (e.g., patch 8024, FIG. 8A) and specifies a gesture (e.g., "Swipe X" for gesture parameter 8026). The gesture patch 8026 is associated with gesture recognition module 241, physics engine 237, and state machine 235. For example, the gesture recognition engine 242 recognizes gestures performed by the user and determines the gesture performed in accordance with the definitions of gestures associated with gesture patches (e.g., patch 8024), the physics engine 237 simulates any physics effects associated with the gesture interaction in the graphical output of an application prototype to which the user interface corresponds during execution of the prototype, and the state machine 235 tracks the state of the executing application prototype in accordance with the defined gestures.

The electronic device couples (934) an output of the gesture patch to an input of a first layer patch (e.g., in accordance with user input), where the input of the first layer patch corresponds to a display parameter of a first layer of the one or more layers. For example, in definition 8000, value output of pop switch patch 8024 is coupled, in accordance with user input, to "X Position" input 8032 of layer patch 8006. The "X Position" input 8032 corresponds to an x-dimensional position parameter of the layer corresponding to layer patch 8006.

The electronic device generates (976) the user interface for display in accordance with the coupling of each image patch, each layer patch, and the gesture patch. For example, with respect to definition 8000, when the application prototype to which definition 8000 corresponds is executed, the prototype execution module 236 generates graphical output that corresponds to the user interface defined in definition 8000, in accordance with the patches and input-output couplings included in definition 8000.

The electronic device receives (980) user-interaction data for manipulating the user interface. The user-interaction data corresponds to the gesture. For example, the electronic device 102 receives user interaction data 346 from mobile device 104 or through an I/O device 210. User interaction data 346 may include data corresponding to user performance of a gesture corresponding to a gesture interaction defined in a definition (e.g., definition 8000).

In response to the user-interaction data, the electronic device updates (986) display of the user interface in accordance with the user-interaction data and the gesture patch as coupled to the first layer patch. For example, the prototype execution module 236 updates the graphical output of the executing application prototype in accordance with the gesture as indicated in the user-interaction data and the gesture definitions in the user interface definition (e.g., definition 8000).

In some embodiments, the electronic device is communicatively coupled with a mobile device having a touch-screen display (904), the user-interaction data are received from the mobile device (982), generating the user interface includes sending to the mobile device the one or more images and initial display parameters for the one or more images (978), the gesture is a gesture on the touch-screen display (984), and/or updating the display of the user interface includes determining an updated display parameter for the first layer patch and sending an indication of the updated display parameter to the mobile device (994). For example, electronic device 102 is communicatively coupled to mobile device 104, from which user interaction data 346 is received. The mobile device 104 includes a touch-sensitive 314 display 312, on which the gesture is performed by the user. When the electronic device 102 generates the user interface, the electronic device 102 sends images associated with the executing application prototype and initial values for corresponding display parameters to the mobile device 104, as described above with reference to FIGS. 5A-6D. The electronic device 102 determines updated display parameters in accordance with the user interaction data 346, including user interaction data corresponding to the gesture, and updates the graphical output accordingly, including sending indications of the updated display parameters to the mobile device 104, as described above with reference to FIGS. 5A-6D.

In some embodiments, the electronic device and the mobile device are communicatively coupled through a direct wired connection (906). For example, the electronic device 102 and mobile device 104 are coupled by a communicative connection 106 that is a wire or cable directly coupling the two devices.

In some embodiments, the electronic device has a display (908), and generating the user interface includes displaying the user interface on the display (979). The electronic device 102, for example, has a display 212, and application prototyping module 230, as part of generating the user interface, displays the user interface as graphical output of the executing application prototype on the display 212 (e.g., as in images 8060, 8072, etc.).

In some embodiments, the one or more images include a plurality of images (912). For example, the electronic device couples the output of the gesture patch to an input of a second layer patch (972). Updating the display of the user interface is performed in further accordance with the gesture patch as coupled to the second layer patch (992).

In some embodiments, the one or more images comprise a plurality of images (912). The output of the gesture patch that couples to the input of the first layer patch is a value output that provides an absolute value corresponding to progress of the gesture (962). The gesture patch further includes a progress output that provides an indication of a relative degree of progress of the gesture (964). As shown in FIG. 8A, for example, definition 8000 includes multiple images, respectively corresponding to image patches 8008 and 8016. Pop switch patch 8024 in definition 8000 includes a value output 8028 coupled to "X Position" input 8032 of layer patch 8006. Value output 8028 supplies an absolute value, within a range defined by the start value and end value parameters inclusive, to the input based on a gesture matching the gesture defined by the pop switch patch 8024. For example, if the x-position of the finger performing the gesture on the touch-sensitive display is X, the value supplied to the image input of the layer patch 8006 is X, without any translation, conversion, or mapping, and subject to start value and end value bounds. Alternatively, the x-position of the finger is scaled to define an absolute pixel position provided by the value output 8028. The pop switch patch 8024 also includes a progress output 8030 that supplies a value indicative of a relative degree of progress of a gesture matching the gesture defined by the pop switch patch 8024. For example, the progress output may supply a value between 0 to 1, inclusive, that indicates a relative degree of progress of the gesture.

In some embodiments, the electronic device couples the progress output of the gesture patch to an input of a second layer patch, where the input of the second layer patch corresponds to a display parameter of the second layer (974), and updating the display of the user interface is performed in further accordance with the gesture patch as coupled to the second layer patch (992). For example, in FIG. 8C the value output 8028 is coupled to the layer patch 8006 and the progress output 8030 is coupled to the layer patch 8004.

In some embodiments, the gesture is a swipe gesture (916), and the display parameter is a x-dimensional or y-dimensional position value (936). A gesture patch (e.g., pop switch patch 8024) may be configured to define a swipe gesture (e.g., by setting "Gesture" input 8026 to "Swipe X" or "Swipe Y"). With a swipe gesture, a display parameter that is updated is an x-dimensional or y-dimensional position value of a layer (e.g., "X Position" input/parameter 8032).

In some embodiments, the gesture is a pinching or de-pinching gesture (918), and the display parameter is a scale value (938). A gesture patch (e.g., pop switch patch 8024) may be configured to define a pinch or de-pinch gesture. With a pinch or de-pinch gesture, a display parameter that is updated is a scale parameter of a layer (e.g., "Scale" input/parameter 8054).

In some embodiments, the gesture patch comprises a start-value field and an end-value field (920). The electronic device specifies (926) a start value in the start-value field and an end value in the end-value field (e.g., in accordance with user input), and the output of the gesture patch provides values between the start value and the end value, in accordance with progress of the gesture (940). For example, a gesture patch (e.g., pop switch patch 8122) may include a start value parameter (e.g., start value parameter 8170) and an end value parameter (e.g., end value parameter 8172), for which values may be specified by the user. In FIG. 8E, "−400" is specified for start value parameter 8170, and "400" is specified for end value parameter 8172. The values supplied by value output 8126 of patch 8122 are values between −400 (start value parameter 8170) and 400 (end value parameter 8172). In some embodiments, the range defined by the start value and end value is inclusive of the start value and end value. In some other embodiments, the range defined by the start value and end value is exclusive of the start value and end value.

In some embodiments, the gesture patch further comprises a bounciness field (922). The electronic device specifies (e.g., in accordance with user input), in the bounciness field, a degree of bounciness for an animation to be displayed in the user interface based on the user-interaction data corresponding to the gesture (928), the output of the gesture patch provides values in accordance with the degree of bounciness (942), and updating the display comprises generating the animation (988). For example, a gesture patch (e.g., pop switch patch 8122) may include a bounciness parameter (e.g., bounciness parameter 8178), for which a value may be specified by the user. In FIG. 8E, "1" is specified for the bounciness parameter 8178. The values supplied by value output 8126 of patch 8122 are values provided in accordance with the bounciness parameter 8178 (e.g., adjusted as necessary from the actual values to account for the bounciness parameter). When the application prototyping module 230 updates the graphical output, the updating includes generating an animation that includes the bounciness in accordance with the bounciness parameter 8178.

In some embodiments, the gesture patch further comprises a speed field (924). The electronic device specifies (e.g., in accordance with user input), in the speed field, a speed for an animation to be displayed in the user interface in response to the user-interaction data corresponding to the gesture (930), the output of the gesture patch provides values in accordance with the speed (944), and updating the display comprises generating the animation (988). For example, a gesture patch (e.g., pop switch patch 8122) may include a speed parameter (e.g., speed parameter 8180), for which a value may be specified by the user. In FIG. 8E, "9" is specified for the speed parameter 8180. The values supplied by value output 8126 of patch 8122 are values provided in accordance with the speed parameter 8180 (e.g., adjusted as necessary from the actual values to account for the speed parameter). When the application prototyping module 230 updates the graphical output, the updating includes generating an animation with a speed in accordance with the speed parameter 8180.

In some embodiments, the output of the gesture patch is a value output or progress output (946), and the gesture patch further comprises a turn-on field, a turn-off field, and an on/off output (948). The electronic device specifies (932)

a turn-on value in the turn-on field and a turn-off value in the turn-off field (e.g., in accordance with user input). The on/off output of the gesture patch provides an on/off signal in accordance with a comparison of progress of the gesture to the turn-on value and turn-off value (950), the on/off output is coupled to an input of a respective layer patch (951), and updating the display comprises turning on or off the layer corresponding to the respective layer patch, in accordance with the on/off signal (990). For example, a gesture patch (e.g., pop switch patch 8024) may include a turn-on parameter (e.g., "Turn On" toggle parameter 8069) and a turn-off parameter (e.g., "Turn Off" toggle parameter 8070), for which values may be specified by the user, and an on/off output 8031. Values may be specified for "Turn On" parameter 8069 and/or "Turn Off" parameter 8070 in accordance with user input; these parameters are user configurable. On/off output 8031 supplies an on/off signal based on a comparison of progress of a gesture to the "Turn On" parameter 8069 and/or the "Turn Off" parameter 8070 (e.g., if a progress value matches the value of the "Turn Off" parameter 8070, an off signal is output). On/off output 8031 may be coupled to a layer patch input that accepts on/off signals. When the application prototyping module updates the graphical output, the updating includes turning a layer on or off in accordance with the turn-on parameter and the turn-off parameter, where the layer corresponds to a layer patch with a respective input coupled to the on/off output (e.g., on/off output 8031).

In some embodiments, coupling the output of the gesture patch to the input of the first layer patch includes selecting and configuring a transition patch (952), coupling the output of the gesture patch to an input of the transition patch (956), and coupling an output of the transition patch to the input of the first layer patch (958). For example, in definition 8000, progress output 8030 was coupled to input 8042 of transition patch 8034 and input 8044 of transition patch 8036. Output 8046 of transition patch 8034 is coupled to opacity input 8048 of layer patch 8004. Output 8052 of transition patch 8036 is coupled to scale input 8054 of layer patch 8004.

In some embodiments, configuring the transition patch includes specifying a start value and an end value for the transition patch (954), and the output of the transition patch provides values between the start value and the end value, in accordance with progress of the gesture (960). A transition patch may have a start value parameter and an end value parameter. For example, transition patch 8036 includes a start value parameter 8037 and an end value parameter 8039. The value supplied by value output 8052 of transition patch 8036 is based on the gesture and within a range defined by start value parameter 8037 and end value parameter 8039.

In some embodiments, the display parameter of the first layer is selected from the group consisting of an anchor point for an image, an x-dimensional position value, a y-dimensional position value, a z-dimensional position value, an x-dimensional rotation value, a y-dimensional rotation value, a z-dimensional rotation value, a width, a height, an opacity, a fill color, and a scale (966). A layer patch (e.g., patch 8004, FIG. 8A) of a layer and corresponding layer data includes one or more display parameters that affect the display of an image associated with the layer. The parameters include, for example, position values in the three dimensional axes, rotational values in the three dimensional axes, width, height, opacity, a solid color that fills the layer, and a scale (e.g., zoom level).

In some embodiments, the display parameter of the first layer is selected from the group consisting of an x-dimensional position value, a y-dimensional position value, and a z-dimensional position value (968). In some embodiments, the display parameter of the first layer is selected from the group consisting of an opacity, a fill color, and a scale (970).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method comprising, at an electronic device having one or more processors and memory storing instructions for execution by the one or more processors, the instructions including a utility for user-interface prototyping, in the utility:
   developing a user-interface prototype, the developing comprising:
     selecting a gesture patch and specifying a gesture for the gesture patch, wherein the gesture patch is a graphical element for defining the user-interface prototype and is associated with an underlying gesture recognition engine, physics engine, and state machine;
     selecting a first layer patch corresponding to a first layer of the user-interface prototype, wherein the first layer corresponds to a first image in the user-interface prototype and the first layer patch is a graphical element for defining the user-interface prototype; and
     coupling an output of the gesture patch to an input of the first layer patch, wherein the input of the first layer patch corresponds to a display parameter of the first layer;
   generating the user-interface prototype for display;
   receiving user-interaction data for manipulating the user-interface prototype, the user-interaction data corresponding to the gesture; and
   in response to the user-interaction data, updating display of the user-interface prototype in accordance with the user-interaction data and the coupling of the gesture patch to the input of the first layer patch.

2. The method of claim 1, wherein developing the user-interface prototype further comprises:
   selecting an image patch for the first image and coupling an image output of the image patch to an image input of the first layer patch,
   wherein the image patch is a graphical element for defining the user-interface prototype.

3. The method of claim 1, wherein:
   the gesture is a swipe gesture; and
   the display parameter is a x-dimensional or y-dimensional position value.

4. The method of claim 1, wherein:
the gesture is a pinching or de-pinching gesture; and
the display parameter is a scale value.

5. The method of claim 1, wherein:
the gesture patch comprises a start-value field and an end-value field;
the method further comprises specifying a start value in the start-value field and an end value in the end-value field; and
the output of the gesture patch provides values between the start value and the end value, in accordance with progress of the gesture.

6. The method of claim 5, wherein:
the gesture patch further comprises a bounciness field;
the method further comprises specifying, in the bounciness field, a degree of bounciness for an animation to be displayed in the user-interface prototype based on the user-interaction data corresponding to the gesture;
the output of the gesture patch provides values in accordance with the degree of bounciness; and
updating the display comprises generating the animation.

7. The method of claim 5, wherein:
the gesture patch further comprises a speed field;
the method further comprises specifying, in the speed field, a speed for an animation to be displayed in the user-interface prototype in response to the user-interaction data corresponding to the gesture;
the output of the gesture patch provides values in accordance with the speed; and
updating the display comprises generating the animation.

8. The method of claim 5, wherein:
the output of the gesture patch is a value output or progress output;
the gesture patch further comprises a turn-on field, a turn-off field, and an on/off output;
the method further comprises specifying a turn-on value in the turn-on field and a turn-off value in the turn-off field;
the on/off output of the gesture patch provides an on/off signal in accordance with a comparison of progress of the gesture to the turn-on value and turn-off value;
the on/off output is coupled to an input of the first layer patch; and
updating the display comprises turning on or off the first layer in accordance with the on/off signal.

9. The method of claim 1, wherein coupling the output of the gesture patch to the input of the first layer patch comprises:
selecting and configuring a transition patch;
coupling the output of the gesture patch to an input of the transition patch; and
coupling an output of the transition patch to the input of the first layer patch.

10. The method of claim 9, wherein:
configuring the transition patch comprises specifying a start value and an end value for the transition patch; and
the output of the transition patch provides values between the start value and the end value, in accordance with progress of the gesture.

11. The method of claim 1, wherein:
the user-interface prototype comprises a plurality of images including the first image;
the method further comprises coupling the output of the gesture patch to an input of a second layer patch corresponding to a second layer of the user-interface prototype, wherein the second layer corresponds to a second image in the user-interface prototype and the second layer patch is a graphical element for defining the user-interface prototype; and
updating the display of the user-interface prototype is performed in further accordance with the gesture patch as coupled to the second layer patch.

12. The method of claim 1, wherein:
the user-interface prototype comprises a plurality of images including the first image;
the output of the gesture patch that couples to the input of the first layer patch is a value output that provides an absolute value corresponding to progress of the gesture; and
the gesture patch further comprises a progress output that provides an indication of a relative degree of progress of the gesture.

13. The method of claim 12, wherein:
the method further comprises coupling the progress output of the gesture patch to an input of a second layer patch corresponding to a second layer of the user-interface prototype, wherein the second layer corresponds to a second image in the user-interface prototype, the second layer patch is a graphical element for defining the user-interface prototype, and the input of the second layer patch corresponds to a display parameter of the second layer; and
updating the display of the user-interface prototype is performed in further accordance with the gesture patch as coupled to the second layer patch.

14. The method of claim 1, wherein the display parameter of the first layer is selected from the group consisting of an anchor point for an image, an x-dimensional position value, a y-dimensional position value, a z-dimensional position value, an x-dimensional rotation value, a y-dimensional rotation value, a z-dimensional rotation value, a width, a height, an opacity, a fill color, and a scale.

15. The method of claim 1, wherein the display parameter of the first layer is selected from the group consisting of an opacity, a fill color, and a scale.

16. The method of claim 1, wherein:
the electronic device is communicatively coupled with a mobile device having a touch-screen display;
the user-interaction data are received from the mobile device;
generating the user-interface prototype comprises sending to the mobile device the one or more images and initial display parameters for the one or more images;
the gesture is a gesture on the touch-screen display; and
updating the display of the user-interface prototype comprises determining an updated display parameter for the first layer patch and sending an indication of the updated display parameter to the mobile device.

17. The method of claim 16, wherein the electronic device and the mobile device are communicatively coupled through a direct wired connection.

18. The method of claim 1, wherein:
the electronic device has a display; and
generating the user-interface prototype comprises displaying the user-interface prototype on the display.

19. An electronic device, comprising:
one or more processors; and
memory storing one or more programs for execution by the one or more processors, the one or more programs including a utility for user-interface prototyping and instructions for:
in the utility:
developing a user-interface prototype, the developing comprising:

selecting a gesture patch and specifying a gesture for the gesture patch, wherein the gesture patch is a graphical element for defining the user-interface prototype and is associated with an underlying gesture recognition engine, physics engine, and state machine;

selecting a first layer patch corresponding to a first layer of the user-interface prototype, wherein the first layer corresponds to a first image in the user-interface prototype and the first layer patch is a graphical element for defining the user-interface prototype; and coupling an output of the gesture patch to an input of the first layer patch, wherein the input of the first layer patch corresponds to a display parameter of the first layer;

generating the user-interface prototype for display;

receiving user-interaction data for manipulating the user-interface prototype, the user-interaction data corresponding to the gesture; and in response to the user-interaction data, updating display of the user-interface prototype in accordance with the user-interaction data and the coupling of the gesture patch to the input of the first layer patch.

20. A non-transitory computer-readable storage medium storing one or more programs for execution by one or more processors of an electronic device, the one or more programs including a utility for user-interface prototyping and instructions for:

in the utility:
developing a user-interface prototype, the developing comprising:

selecting a gesture patch and specifying a gesture for the gesture patch, wherein the gesture patch is a graphical element for defining the user-interface prototype and is associated with an underlying gesture recognition engine, physics engine, and state machine;

selecting a first layer patch corresponding to a first layer of the user-interface prototype, wherein the first layer corresponds to a first image in the user-interface prototype and the first layer patch is a graphical element for defining the user-interface prototype; and coupling an output of the gesture patch to an input of the first layer patch, wherein the input of the first layer patch corresponds to a display parameter of the first layer;

generating the user-interface prototype for display;

receiving user-interaction data for manipulating the user-interface prototype, the user-interaction data corresponding to the gesture; and in response to the user-interaction data, updating display of the user-interface prototype in accordance with the user-interaction data and the coupling of the gesture patch to the input of the first layer patch.

\* \* \* \* \*